US012700522B1

(12) United States Patent
Olsson et al.

(10) Patent No.: US 12,700,522 B1
(45) Date of Patent: \*Aug. 4, 2026

(54) VIDEO PUSH-CABLES FOR PIPE INSPECTION SYSTEMS

(71) Applicant: SeeScan, Inc., San Diego, CA (US)

(72) Inventors: Mark S. Olsson, La Jolla, CA (US);
Alexander L. Warren, Escondido, CA (US); Stephanie M. Bench,
Sandersville, GA (US); Ray Merewether, La Jolla, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,341

(22) Filed: Apr. 3, 2023

Related U.S. Application Data

(62) Division of application No. 17/001,337, filed on Aug. 24, 2020, now Pat. No. 11,621,099, which is a division of application No. 14/970,362, filed on Dec. 15, 2015, now Pat. No. 10,764,541.

(60) Provisional application No. 62/092,233, filed on Dec. 15, 2014.

(51) Int. Cl.
| | |
|---|---|
| *H01B 1/02* | (2006.01) |
| *H01B 3/30* | (2006.01) |
| *H01B 3/47* | (2006.01) |
| *H04N 7/18* | (2006.01) |
| *G03B 37/00* | (2021.01) |
| *H04N 23/50* | (2023.01) |

(52) U.S. Cl.
CPC ............. *H01B 1/026* (2013.01); *H01B 3/306* (2013.01); *H01B 3/47* (2013.01); *H04N 7/183* (2013.01); *G03B 37/005* (2013.01); *H04N 23/555* (2023.01)

(58) Field of Classification Search
None
See application file for complete search history.

(56) References Cited

U.S. PATENT DOCUMENTS

| | | | |
|---|---|---|---|
| 3,764,779 A | 10/1973 | Kadoya et al. | |
| 5,500,488 A | 3/1996 | Buckel | |
| 6,229,453 B1 * | 5/2001 | Gardner | E21B 47/12 348/E7.087 |
| 8,289,385 B2 | 10/2012 | Olsson et al. | |
| 8,547,428 B1 * | 10/2013 | Olsson | G01N 21/8803 348/374 |
| 2004/0222009 A1 * | 11/2004 | Blew | H01B 3/441 174/110 F |

(Continued)

FOREIGN PATENT DOCUMENTS

| | | |
|---|---|---|
| GB | 2172079 | 9/1986 |
| GB | 2230612 | 10/1990 |

OTHER PUBLICATIONS

International Searching Authority, "Written Opinion of the International Searching Authority" for PCT Patent Application No. PCT/US15/65903, Jun. 23, 2016, European Patent Office, Munich.

*Primary Examiner* — Stuart D Bennett

(74) *Attorney, Agent, or Firm* — Steven C. Tietsworth, Esq.; Michael J. Pennington, Esq.

(57) ABSTRACT

Systems for inspecting pipes or cavities including a camera head, a coaxial push-cable, and a video signal transmitter and a communicatively coupled camera control unit (CCU) are disclosed.

21 Claims, 18 Drawing Sheets

(56) References Cited

U.S. PATENT DOCUMENTS

| 2011/0061888 A1* | 3/2011 | Amato | H01B 11/1826 |
| | | | 174/102 R |
| 2013/0014973 A1* | 1/2013 | Shinmoto | H01B 7/30 |
| | | | 174/126.1 |
| 2013/0323965 A1* | 12/2013 | Buenz | H01R 24/38 |
| | | | 439/578 |

* cited by examiner

VIDEO PUSH-CABLES FOR PIPE INSPECTION SYSTEMS

CROSS-REFERENCE TO RELATED APPLICATIONS

This application is a Divisional of and claims priority to co-pending U.S. Utility patent application Ser. No. 14/970,362, filed Dec. 15, 2015, entitled COAXIAL VIDEO PUSH-CABLES FOR USE IN INSPECTION SYSTEMS, which claims priority under 35 U.S.C. § 119(e) to U.S. Provisional Patent Application Ser. No. 62/092,233, filed Dec. 15, 2014, entitled COAXIAL VIDEO PUSH-CABLES FOR PRO-VIDING POWER AND SIGNALING IN VIDEO INSPEC-TION SYSTEMS. The content of each of these applications is hereby incorporated by reference herein in its entirety for all purposes.

FIELD

This disclosure relates generally to systems for inspecting the interior of pipes, conduits or other voids through use of images or video. More specifically, but not exclusively, this disclosure relates to video push-cables having a coaxial cable structure for providing electrical power and data or other signaling between a camera head and a camera control unit (CCU) or other display device.

BACKGROUND

Devices and methods for visualizing the interior of pipes or other cavities using imaging are well known in the art. For example, existing pipe inspection systems may include a camera head coupled to a video push-cable, with the camera head pushed into the pipe to facilitate displaying, recording and/or mapping of the pipe interior by capturing images or video for display or recording.

Conventional pipe inspection systems generally include a semi-rigid video push-cable that provides a mechanical connection between a rotatable drum reel, used to dispense the video push-cable and urge an attached camera head down a pipe, as well as multiple electrical conductors and corresponding connections that provide power to and/or images, video, and/or control signals between the camera head and camera control device. The camera head may include imaging sensor (imagers), associated electronics, optics, lighting elements (e.g., LEDs) and/or other sensors to generate images or video of the pipe's interior, as well as to provide additional information. Images and video taken within the pipe may be transferred via electrical connections in the video push-cable to a CCU (or other device) connected to the drum reel at the ground surface, typically on dedicated conductors. The CCU may display and/or store the images or video, and may also control operation of the camera head. Some existing video push-cables also transmit DC electrical power from the CCU to the camera head to power camera head electronics and lights, also typically on dedicated conductors.

Existing video push-cables used for pipe inspection systems are often helically wrapped with filler rods and conductors wound around a semi-rigid central push-rod element that is non-conductive. The central push-rod element is typically a high-strength rod of composite material, such as fiberglass, which provides the stiffness necessary to deploy the video push-cable a considerable distance, yet is flexible enough to allow bending around sharp turns in pipes or other voids. These video push-cables, however, can be difficult to deploy or retract, and/or may cause problems with signaling and power provision when used with newer camera heads. Further, existing push cables typically have two or more conductors positioned around or outside the central push-rod element. These conductors are difficult to terminate in the field (such as when a push-cable breaks during deployment or retraction). Normally a broken push-cable requires a return to a repair facility, where conductors must be soldered back onto termination connectors or splice connectors to get the push-cable back into service.

As noted above, coaxial cables are well known in the art. However, coaxial cables known in the art are designed to minimize capacitive loss, and teach towards utilizing materials with low dielectric constants as an insulator positioned between inner and outer/shield conductors. Such low dielectric constant materials are used to achieve a target impedance with a minimal cross-sectional diameter. Commonly used dielectric materials may further be chosen so as to reduce power loss by selecting an appropriate loss tangent, as well as for providing a suitable modulus of elasticity to allow the cable to easily bend and flex. As such, coaxial cables known in the art lack in the elastic modulus, stiffness, and strength required of a push-cable.

Accordingly, there is a need in the art to address the above-described as well as other problems to provide enhanced performance video push-cables.

SUMMARY

The present disclosure relates generally to systems, methods, and apparatus used in visual inspections within pipes or other cavities using camera heads disposed on video push-cables. More specifically, but not exclusively, the disclosure relates to coaxial video push-cables for use in pipe inspection with improved strength and durability that provide electrical signaling and AC power.

For example, in one aspect the disclosure relates to a coaxial video push-cable. The push-cable may include, for example, an inner or central conductor including a structural core and an outer layer, an insulating dielectric layer or element, an outer conductor array, and an outer jacket enclosing the outer conductor array, dielectric layer, and inner conductor. The push-cable may further include an insulating layer disposed between the inner conductor and the dielectric layer.

In another aspect, the disclosure relates to a system for video inspection of piping or cavities. The system may include, for example, a camera head including a video signal transmitter, and a coaxial video push-cable having a proximal end and a distal end. The push-cable may include an inner conductor, an insulating dielectric layer disposed around the inner conductor, and an outer partially flexible structural element disposed around the tubular insulating element. The video signal transmitter may receive images or video from an imaging sensor and may provide the images or video as an output signal in analog or digital signal formats. The output of the video signal transmitter may be coupled to the inner conductor at the distal end of the push-cable to send a video signal through the push-cable to a coupled camera control unit (CCU) or other coupled device or system, such as a video receiver, a notebook computer or tablet, or another electronic device or system.

In another aspect, the disclosure relates to a coaxial video-push cable. The coaxial video push-cable may include, for example, an inner conductor comprising a structural core and a conductive outer layer. The structural core may comprise a material having a first electrical conductivity, and the outer conductive layer may comprise a material having an electrical conductivity higher than the structural core. The push-cable may further include an insulating dielectric layer of a synthetic fiber material disposed around the inner conductor. The synthetic fiber material may be fiberglass. The fiberglass may have a dielectric constant of approximately 3 or greater. The push-cable may further include an outer conductor array. The outer conductor array may comprise a plurality of conductors. Each of the plurality of conductors of the outer array may include a structural core and a conductive outer layer. The push-cable may further include an insulating layer between the inner conductor and the insulating dielectric layer. The insulating layer may be a polyimide or other film material. The push-cable may further include a braid or jacket. The braid or jacket may comprise a high electrical conductivity material. The braid or jacket may be electrically coupled to the outer conductor array.

Various additional aspects, features, functions, and details are further described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION OF EMBODIMENTS

Overview

Figure 1:
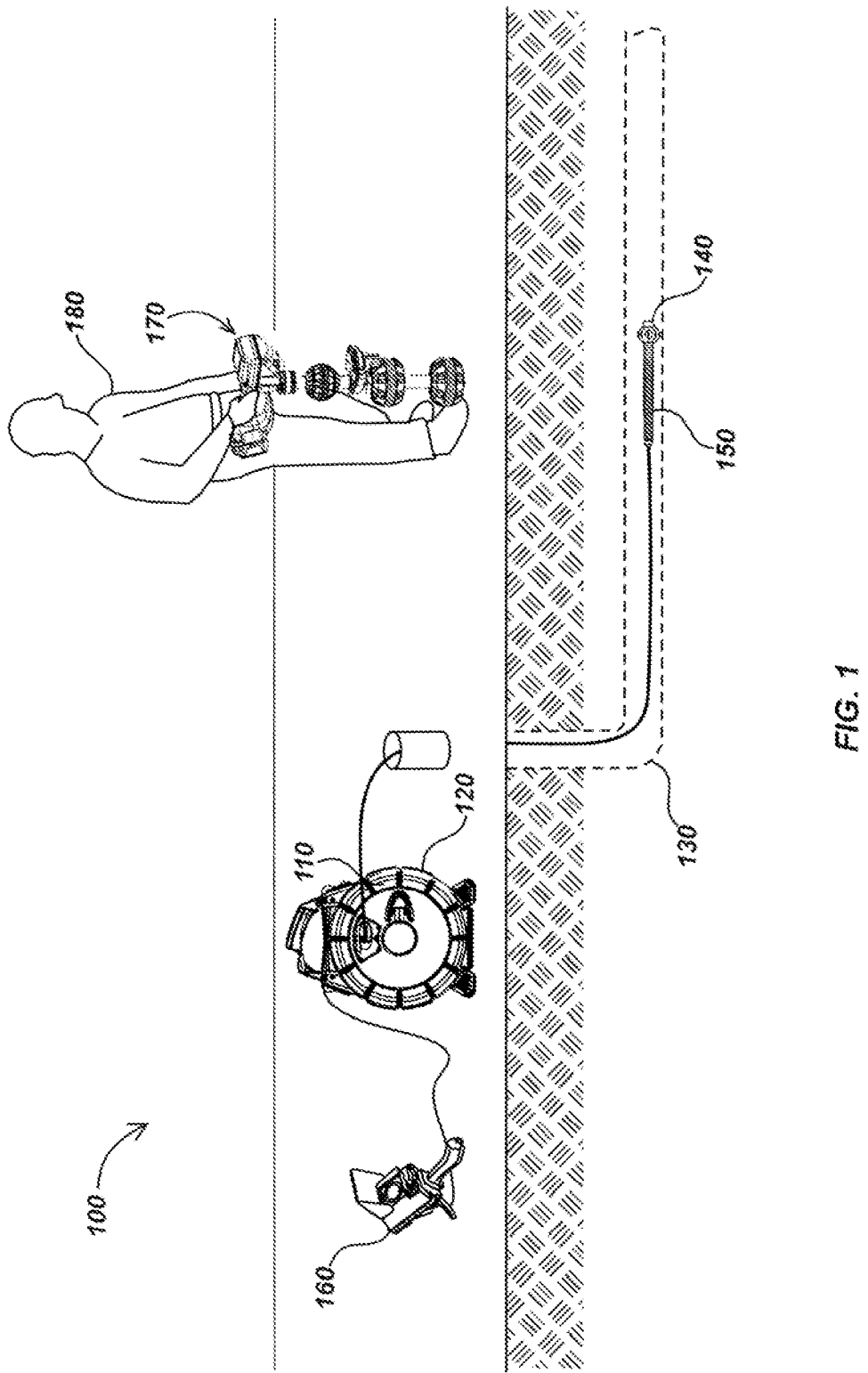
FIG. 1 illustrates details of an embodiment of a pipe inspection system with a coaxial video push-cable in accordance with certain aspects.

Various details of video push-cables that may be used in additional device or system embodiments in conjunction with the disclosures herein are described in co-assigned patents and patent applications including: U.S. Pat. No. 5,808,239, issued Sep. 15, 1998, entitled VIDEO PUSH CABLE; U.S. Pat. No. 5,939,679, issued Aug. 17, 1999, entitled VIDEO PUSH CABLE; U.S. patent application Ser. No. 13/874,879, filed May 1, 2012, entitled HIGH BAND-WIDTH PUSH CABLES FOR VIDEO PIPE INSPECTION SYSTEMS; and U.S. patent application Ser. No. 14/207,517, filed Mar. 12, 2014, entitled HIGH BANDWIDTH PUSH-CABLES FOR VIDEO PIPE INSPECTION SYSTEMS.

In addition, various details of video pipe inspection systems, apparatus, devices, configurations, and methods of operation and use that may be used in additional embodiments in conjunction with the coaxial video push-cable disclosures herein are described in co-assigned patents and patent applications including: U.S. Pat. No. 5,939,679, issued Aug. 17, 1999, entitled VIDEO PUSH CABLE; U.S. Pat. No. 6,545,704, issued Apr. 8, 2002, entitled VIDEO PIPE INSPECTION DISTANCE MEASURING SYSTEM; U.S. Pat. No. 6,831,679, issued Dec. 14, 2004, entitled VIDEO CAMERA HEAD WITH THERMAL FEEDBACK LIGHTING CONTROL; U.S. Pat. No. 7,619,516, issued Mar. 11, 2005, entitled SINGLE AND MULTI-TRACE OMNIDIRECTIONAL SONDE AND LINE LOCATORS AND TRANSMITTER USED THEREWITH; U.S. Pat. No. 6,958,767, issued Oct. 25, 2005, entitled VIDEO PIPE INSPECTION SYSTEM EMPLOYING NON-ROTATING CABLE STORAGE DRUM; U.S. Pat. No. 7,298,126, issued Mar. 8, 2007, entitled SONDES FOR LOCATING UNDERGROUND PIPES AND CONDUITS; U.S. Pat. No. 7,336,078, issued Feb. 26, 2008, entitled MULTI-SENSOR MAPPING OMNI-DIRECTIONAL SONDE AND LINE LOCATORS AND TRANSMITTER USED THEREWITH; U.S. patent application Ser. No. 12/704,808, filed Feb. 12, 2010, entitled PIPE INSPECTION SYSTEM WITH REPLACEABLE CABLE STORAGE DRUM; U.S. patent application Ser. No. 12/715,684, filed Mar. 2, 2010, entitled METHODS AND APPARATUS FOR HIGH-SPEED DATA TRANSFER EMPLOYING SELF-SYNCHRONIZING QUADRATURE AMPLITUDE MODULATION (QAM); U.S. patent application Ser. No. 12/947,503, filed Nov. 16, 2010, entitled IMAGE-BASED MAPPING LOCATING SYSTEM; U.S. patent application Ser. No. 13/073,919, filed Mar. 28, 2011, entitled PIPE INSPECTION SYSTEM WITH JETTER PUSH-CABLE; U.S. patent application Ser. No. 13/346,668, filed Jan. 9, 2012, entitled PORTABLE CAMERA CONTROLLER PLATFORM FOR USE WITH PIPE INSPECTION SYSTEM; U.S. patent application Ser. No. 13/356,408, filed Jan. 23, 2012, entitled SONDES AND METHODS FOR USE WITH BURIED LINE LOCATOR SYSTEMS; U.S. patent application Ser. No. 13/358,463, filed Jan. 25, 2012, entitled SELF-LEVELING INSPECTION SYSTEMS AND METHODS; U.S. patent application Ser. No. 13/570,211, filed Aug. 8, 2012, entitled PHASE SYNCHRONIZED BURIED OBJECT LOCATOR APPARATUS, SYSTEMS, AND METHODS; U.S. patent application Ser. No. 13/609,196, filed Sep. 10, 2012, entitled SYSTEMS AND METHODS FOR DATA TRANSFER USING SELF-SYNCHRONIZING QUADRATURE AMPLITUDE MODULATION (QAM); U.S. patent application Ser. No. 13/647,310, filed Oct. 8, 2012, entitled PIPE INSPECTION SYSTEM APPARATUS AND METHODS; U.S. Pat. No. 8,289,385, filed Oct. 16, 2012, entitled PUSH-CABLE FOR PIPE INSPECTION SYSTEM; U.S. Pat. No. 8,540,429, issued Oct. 16, 2012, entitled PUSH-CABLE FOR PIPE INSPECTION SYSTEM; U.S. patent application Ser. No. 13/676,018, filed Nov. 13, 2012, entitled POR- TABLE PIPE INSPECTION SYSTEMS AND APPARA- TUS; U.S. patent application Ser. No. 13/774,351, filed Feb. 22, 2013, entitled DOCKABLE TRIPODAL CAMERA CONTROL UNIT; U.S. Pat. No. 8,395,661, issued Mar. 12, 2013, entitled PIPE INSPECTION SYSTEM WITH SELECTIVE IMAGE CAPTURE; U.S. patent application Ser. No. 13/826,112, filed Mar. 14, 2013, entitled SYSTEMS AND METHODS INVOLVING A SMART CABLE STOR- AGE DRUM AND NETWORK NODE FOR TRANSMIS- SION OF DATA; U.S. patent application Ser. No. 13/874, 879, filed May 1, 2013, entitled HIGH BANDWIDTH PUSH-CABLES FOR VIDEO INSPECTION SYSTEMS; U.S. patent application Ser. No. 13/913,485, filed Jun. 9, 2013, entitled MULTI-CAMERA PIPE INSPECTION APPARATUS, SYSTEMS, AND METHODS; U.S. patent application Ser. No. 13/941,381, filed Jul. 12, 2013, entitled SELF-GROUNDING TRANSMITTING PORTABLE CAMERA CONTROLLER FOR USE WITH PIPE INSPECTION SYSTEMS; U.S. patent application Ser. No. 13/974,020, issued Aug. 22, 2013, entitled SELF-LEVEL- ING CAMERA HEADS; U.S. patent application Ser. No. 14/033,349, filed Sep. 20, 2013, entitled PIPE INSPEC- TION SYSTEM WITH SNAP-ON PIPE GUIDES; U.S. Pat. No. 8,587,648, issued Nov. 19, 2013, entitled SELF-LEV- ELING CAMERA HEAD; U.S. Pat. No. 8,547,428, issued Oct. 1, 2013, entitled PIPE MAPPING SYSTEM; U.S. patent application Ser. No. 14/136,104, filed Dec. 20, 2013, entitled ROTATING CONTACT ASSEMBLIES FOR SELF-LEVELING CAMERA HEADS; U.S. patent appli- cation Ser. No. 14/203,485, filed Mar. 10, 2014, entitled PIPE INSPECTION CABLE COUNTER AND OVERLAY MANAGEMENT SYSTEM; U.S. patent application Ser. No. 14/207,517, filed Mar. 12, 2014, entitled HIGH BAND- WIDTH PUSH CABLES FOR VIDEO INSPECTION SYS- TEMS; U.S. patent application Ser. No. 14/213,458, filed Mar. 14, 2014, entitled SELF-GROUNDING TRANSMIT- TING PORTABLE CAMERA CONTROLLER FOR USE WITH PIPE INSPECTION SYSTEMS; U.S. patent appli- cation Ser. No. 14/216,552, filed Mar. 17, 2014, entitled SYSTEMS AND METHODS FOR DATA TRANSFER USING SELF-SYNCHRONIZING QUADRATURE AMPLITUDE MODULATION (QAM); U.S. patent appli- cation Ser. No. 14/216,358, filed Mar. 17, 2014, entitled SMART CABLE STORAGE DRUM AND NETWORK NODE SYSTEM AND METHODS; U.S. patent application Ser. No. 14/271,255, filed May 6, 2014, entitled SPRING ASSEMBLIES WITH VARIABLE FLEXIBILITY FOR USE WITH PUSH-CABLES AND PIPE INSPECTION SYSTEMS; U.S. patent application Ser. No. 14/469,536, filed Aug. 26, 2014, entitled CABLE STORAGE DRUM WITH MOVEABLE CCU DOCKING APPARATUS; U.S. Pat. No. 8,908,027, issued Dec. 9, 2014, entitled ASYM- METRIC DRAG FORCE BEARING FOR USE WITH PUSH-CABLE STORAGE DRUM; U.S. patent application Ser. No. 14/642,596, filed Mar. 9, 2015, entitled PIPE CLEARING CABLES AND APPARATUS; U.S. patent application Ser. No. 14/690,285, filed Apr. 17, 2015, entitled PIPE INSPECTION SYSTEM WITH PUSH-CABLE, JET- TER, AND CAMERA HEAD; U.S. patent application Ser. No. 14/709,301, filed May 11, 2015, entitled PIPE MAP- PING SYSTEMS AND METHODS; U.S. Pat. No. 9,041, 794, issued May 26, 2015, entitled PIPE MAPPING SYS- TEMS AND METHODS; U.S. patent application Ser. No. 14/749,545, filed Jun. 24, 2015, entitled ADJUSTABLE VARIABLE RESOLUTION INSPECTION SYSTEMS AND METHODS; U.S. Pat. No. 9,080,992, issued Jul. 14, 2015, entitled ADJUSTABLE VARIABLE RESOLUTION INSPECTION SYSTEMS AND METHODS; U.S. patent application Ser. No. 14/846,623, filed Sep. 4, 2015, entitled PIPE INSPECTION SYSTEM CAMERA HEADS; U.S. Pat. No. 9,134,255, issued Sep. 15, 2015, entitled PIPE INSPECTION SYSTEM WITH SELECTIVE IMAGE CAPTURE; and U.S. patent application Ser. No. 14/935, 878, filed Nov. 9, 2015, entitled INSPECTION CAMERA DEVICES AND METHODS WITH SELECTIVELY ILLU- MINATED MULTISENSOR IMAGING. The content of each of the above-described patents and applications is incorporated by reference herein in its entirety. The above- described patent applications and patents may be referred to herein collectively as the "incorporated applications."

The present disclosure relates generally to systems, meth- ods, and apparatus used in visual inspections in pipes and other cavities using camera heads deployed on coaxial video push-cables. For example, in one aspect the disclosure relates to a coaxial video push-cable. The push-cable may include, for example, an inner or central conductor including a structural core and an outer layer of a high conductivity material, an insulating dielectric layer or element, an outer partially flexible conductor element array, and an outer jacket enclosing the outer conductor array, dielectric layer, and inner conductor. The push-cable may further include an insulating layer disposed between the inner conductor and the dielectric layer.

The insulating layer may, for example, be a polyimide quad-film. The structural core may include a steel alloy, and the outer layer may be a cladding of a high electrical conductivity material. The high electrical conductivity mate- rial may be copper or a copper alloy. The high electrical conductivity material may be silver or a silver alloy. The structural core may be a wire, and the outer layer may be a cladding layer or plated layer on the wire. The wire may be a steel wire, such as a high strength steel, and the cladding layer may be copper or a copper alloy or other high conductivity materials.

The dielectric layer or element may, for example, com- prise fiberglass. The dielectric layer may comprise carbon fiber. The dielectric layer may be an element in the form of a hollow tube. The hollow tube may be around the inner conductor. The hollow tube may be a fiberglass tube or carbon fiber tube. The inner conductor may, for example, include a plurality of conductors in an inner conductor array.

The outer conductor array may, for example, include a plurality of outer conductors. One or more of the outer conductors may include an outer conductor structural core and an outer conductor outer layer. The diameter of the outer conductors or cross-sectional area of the outer conductors may be smaller than the diameter or cross-sectional area of the inner conductor. One or more of the plurality of outer conductors may include an outer conductor insulating layer. The outer conductor structural core may include a steel alloy, and the outer conductor outer layer may be a cladding of a high electrical conductivity material. The high electrical conductivity material may be copper or a copper alloy. The high electrical conductivity material may be silver or a silver alloy. The outer conductor structural core may be a wire, and the outer layer may be a cladding layer or plating layer on the wire. The wire may be a steel wire, and the cladding layer may be copper or a copper alloy.

The outer conductor array may, for example, include a single layer. The outer conductor ray may alternately include a plurality of layers. The plurality of layers may include a first layer and a second layer disposed or outside the first layer. The second layer may be tightly wound about the first layer. The first layer may be helically wound about the dielectric layer in a first direction, and the second layer is helically wound about the first layer in an direction opposite to the first direction.

The dielectric layer may, for example, comprise a single element. Alternately, the dielectric layer may comprise a plurality of elements. The plurality of elements may include a plurality of rods. The plurality of rods may be bundled. A cross-sectional area of the bundled rods may be substantially the same across the length of the push-cable. Alternately, the cross-sectional area of the bundled plurality of rods may be varied across the length of the push-cable. A first set of rods of the plurality of rods may have a first length, and a second set of rods of the plurality or rods may have a second length shorter the first length. The plurality of rods may include a third set of rods having a third length shorter than the second length and the first length.

The plurality of rods may be bundled to form a proximal section of the push-cable including all of the first, second, and third set of rods, a transitional section of the push-cable including only rods of the first and second set of rods, and a distal section of the push-cable including only rods of the first set of rods. The cross-sectional area of the push-cable in the proximal section may be larger than the cross-sectional area of the push-cable in the transitional section, and the cross-sectional area of the push-cable in the transitional section may be larger than the cross-sectional area in the distal section. The flexibility/stiffness of the push-cable may be varied across the length of the push-cable.

In another aspect, the video push-cable embodiments disclosed herein may be traceable using a buried utility locator when impressed with high frequency current signals. For example, a utility locator device as described in the incorporated applications may be used in a pipe inspection system and may detect high frequency power transmitted through the video push-cable by sensing emitted magnetic fields, to determine and map the location of the coaxial video push-cable within a pipe or other cavity.

In another aspect, the disclosure relates to a system for video inspection of piping or cavities. The system may include, for example, a camera head including a video signal transmitter, and a coaxial video push-cable having a proximal end and a distal end. The push-cable may include an inner conductor, an insulating dielectric layer disposed around the inner conductor, and an outer partially flexible structural element disposed around the tubular insulating element. The video signal transmitter may receive images or video from an imaging sensor and may provide the images or video as an output signal in analog or digital signal formats. The output of the video signal transmitter may be coupled to the inner conductor at the distal end of the push-cable to send a video signal through the push-cable to a coupled camera control unit (CCU) or other coupled device or system, such as a video receiver, a notebook computer or tablet, or another electronic device or system.

The video signal transmitter may, for example, provide the output as a digital video output signal. The video signal transmitter may provide the digital video output signal as a QAM modulated signal. The video signal transmitter may alternately provide an analog video output signal. The video signal transmitter may receive electrical power from the coaxial video push-cable. The electrical power may be provided as AC power through the coaxial video push-cable. The AC power may be provided at a frequency greater than approximately 100 Hz, greater than approximately 1 kHz, greater than approximately 10 kHz, greater than approximately 100 kHz, or greater than approximately 1 MHz.

The inner conductor may, for example, comprise a conductive wire of a high electrical conductivity material. The high electrical conductivity material may be copper, silver, or another high electrical conductivity material as known or developed in the art. The inner conductor may comprise a tubular conductor with a structural core and a conductive outer layer. The structural core may comprise a material having a first electrical conductivity, and the outer conductive layer may comprise a material having an electrical conductivity higher than the structural core. The high electrical conductivity cladding may comprise copper or a copper alloy. The high electrical conductivity cladding may comprise silver or a silver alloy. The high electrical conductivity material may comprise a plastic or polymer material. The structural core of the inner conductor may comprise a metallic material, and the outer conductive layer may comprise a high electrical conductivity coating or cladding. The metallic material of the structural core may comprise steel, and the outer conductive layer may comprise copper or a copper alloy, silver or a silver alloy, or another high electrical conductivity metallic material.

The coaxial video push-cable may, for example, comprise another insulating layer between the inner conductor and the insulating dielectric layer. The another insulating layer may comprise a polyimide (Kapton) or other film material.

The insulating dielectric layer may, for example, comprise a synthetic fiber material. The synthetic fiber material may comprise fiberglass or a carbon fiber material. The insulating dielectric layer may comprise a tubular insulating element of a material having a dielectric constant of about 3 or larger, or 4 or larger, or 5 or larger. The insulating dielectric layer may comprise a dielectric rod assembly having a plurality of rods. The cross-sectional area of the dielectric rod assembly may be varied across the length of the coaxial video push-cable.

The outer partially flexible structural element may, for example, comprise a conductive array having a plurality of conductors. The conductive array may comprise a plurality of conductors. The conductors may be helically wound about the insulating dielectric layer and/or may be longitudinally placed about the insulating dielectric layer. Ones of the plurality of conductors of the conductive array may comprise a structural core and a conductive outer layer. The structural core may comprise a steel material, and the conductive outer layer may comprise a copper or a copper alloy material, a silver or silver alloy material, or another high conductivity material. Ones of the plurality of conductors of conductive array may be helically wound about the insulating layer in a first layer in a first direction. Others of the plurality of conductors may be wound in a second layer in a second direction different from the first direction. The coaxial video push-cable may further comprise another conductive layer. The another conductive layer may be electrically coupled to the conductive array. The another conductive layer may comprise a braid or jacket of a high electrical conductivity material. The high electrical conductivity material of the another conductive layer may comprises copper or a copper alloy material. The high electrical conductivity material of the another conductive layer may comprise another high electrical conductivity material.

In another aspect, the disclosure relates to a coaxial video-push cable. The coaxial video push-cable may include, for example, an inner conductor comprising a structural core and a conductive outer layer. The structural core may comprise a material having a first electrical conductivity, and the outer conductive layer may comprise a material having an electrical conductivity higher than the structural core. The push-cable may further include an insulating dielectric layer of a synthetic fiber material disposed around the inner conductor. The synthetic fiber material may be fiberglass. The fiberglass may have a dielectric constant of approximately 3 or greater. The push-cable may further include an outer conductor array. The outer conductor array may comprise a plurality of conductors. Each of the plurality of conductors of the outer array may include a structural core and a conductive outer layer. The push-cable may further include an insulating layer between the inner conductor and the insulating dielectric layer. The insulating layer may be a polyimide or other film material. The push-cable may further include a braid or jacket. The braid or jacket may comprise a high electrical conductivity material. The braid or jacket may be electrically coupled to the outer conductor array.

The inner conductor structural core may, for example, comprise steel. The inner conductor conductive outer layer may comprise copper or a copper alloy. The outer conductors' structural core may comprise a steel material. The outer conductors' outer layer may comprise copper or a copper alloy. Ones of the outer conductor's plurality of conductors may be helically wound about the insulating dielectric layer in a first layer in a first direction. Further ones of the outer conductors' plurality of conductors may be helically wound in a second layer in a second direction different from the first direction.

Various additional aspects, details, features, and functions are further described below in conjunction with the appended drawing figures.

The term "exemplary" is used herein to mean "serving as an example, instance, or illustration." Any aspect and/or embodiment described herein as "exemplary" is not necessarily to be construed as preferred or advantageous over other aspects and/or embodiments.

Example Video Push-Cable Embodiments for Pipe Inspection Systems

Coaxial cables are well-known in the art and have been used for many decades to provide electrical signals in various electronics devices and systems. Existing coaxial cables are designed to minimize capacitive loss, and teach dielectric materials as an insulator between an inner conductor and outer shield with low dielectric constants. Such low dielectric constant materials are used to achieve a desired characteristic impedance of the cable with a minimal cross-sectional diameter. Commonly used dielectric materials (e.g., PE, PTFE, etc.) may also be chosen so as to reduce power loss by selecting an appropriate loss tangent, as well as to provide a suitable modulus of elasticity to allow the cable to easily bend and flex during deployment and/or use. As such, coaxial cables known in the art lack the mechanical properties desired for push-cables-in particular, elastic modulus, stiffness, and strength to provide good longitudinal rigidity of the push-cable when being forced into a pipe or other cavity. Use of traditional materials for coaxial push-cables can result in poor performance-similar to trying to push a flexible rope through a pipe.

In various inventive embodiments as described subsequently herein, coaxial video push-cables that include a high dielectric constant material as an insulator, such as by using fiberglass or other longitudinally strong materials, are disclosed. These embodiments teach away from traditional coaxial cable technologies that use materials having a low dielectric constant to minimize cable diameter for a particularly targeted impedance/capacitance. In particular, existing coaxial cable technology teaches away from use of fiberglass as a dielectric material due to its relatively high dielectric constant as compared to commonly used materials.

For example, air has a dielectric constant of a bit more than 1, while commonly used polyethylene (PE) and PTFE have dielectric constants with values around two. Glass/epoxy fiberglass materials, on the other hand, have relatively high dielectric constants, in the range of three to four or more. Conversely, as noted above, the art teaches use of well-known low dielectric constant materials, particularly where minimizing cable diameter for a particularly desired impedance is desirable (which it almost always in in inspection system push-cables so as to allow the cables to pass through small cross-sectional areas, obstructions, and bends).

Turning to FIG. 1, an exemplary embodiment of a video pipe inspection system 100 in accordance with certain aspects is illustrated. Inspection system 100 includes a camera head 140 that includes or is coupled to a video signal transmitter for providing images or video signals as an output, a camera control unit (CCU) 160 for controlling camera head operation and receiving, storing in memory, and/or displaying images or video, a push-cable storage drum including a drum wheel 120, and a coaxial video push-cable 110 (also denoted herein for brevity as a "video push-cable" or simply a "push-cable"). The coaxial video push-cable 110 is used for providing images or video signals between the camera head and the CCU, and may also provide power and/or other data. In addition, in other embodiments (not shown in FIG. 1) such as push-cable may also be used to provide power and/or signaling to other devices coupled at the distal end of the push-cable, such as to other electronics, lighting elements, electrical motors, cutting tools, sondes, and the like. Coaxial video push-cables, as described herein, include a cable assembly having partially flexible structural elements to allow the push-cable to bend around curves or obstructions, while also having longitudinal strength to allow the cable to be pushed deep into a pipe or cavity, as well as electrical and/or optical signaling elements for providing power as well as image or video, in the form of analog or video signaling, from a camera head (or other device) to a CCU or other device. Video push-cables may also be used to provide optional additional data or information, such as sensor data, control signaling, and the like.

Some embodiments as described herein may advantageously carry both imaging signals and power, which may be multiplexed/combined on a single conductor and ground/shield or may be provided on separate conductors. Power may be provided via the push-cable to a camera head or other device, for example, in the form of direct current (DC) or, in some embodiments as alternating current (AC) power, particularly at high frequencies (relative to power line mains frequencies of 50 or 60 Hz), to reduce size and/or increase performance of the push-cable and associated inspection system. As noted previously, in some embodiments, video push-cables as described herein may be used to provide power to devices other than camera heads, particular via AC power at frequencies of around 1 kHz or higher, for example to power tools or cutting/cleaning devices, such as rotary cutting heads or other reaming or cutting tools or other motor-driven devices, sondes, lighting devices, or other electrical or electronic devices or systems.

Coaxial video push-cable 110 may be any of the various embodiments of push-cables as described subsequently herein (e.g., embodiments 210, 410, 610, 910, 1110, 1310, 1510, or 1710 or variations or combinations thereof, alone or with additional elements such as those described in the incorporated applications), and may be stored on drum reel 120 when not in use or for storage or transportation. The various details of conductors, insulating dielectric layers, and structural elements of the push-cable embodiments described subsequently may be generally be used in all of the various embodiments described herein, even if not explicitly shown or described.

Returning to FIG. 1, at the start of a video inspection operation, drum reel 120 may be used to deploy coaxial video push-cable 110 into a pipe 130 (or other cavity, not shown) by drawing the video push-cable from the reel (the push-cable is also typically stowed back on the reel upon retraction after an inspection), either mechanically or manually, by an operator 180. A typical coaxial video push-cable provides a mechanical connection between the drum reel 120 at a proximal end of the push-cable and a camera head 140 at a distal end, as well as an electrical connection for power and signaling between the camera head 140 and CCU 160 (or other coupled device or system). An optional coil spring 150 may be positioned around a segment or segments of video push-cable 110 at or near the distal end and behind camera head 140 for additional protection and rigidity.

During a video inspection imaging operation, the camera head 140 generates analog or digital inspection and related signals corresponding to video and/or still images and/or other inspection data, such as environmental sensor data, location data, orientation data, position data, and/or other data or information, from within pipe 130 (or other cavities into which it is deployed). Such inspection data signals may further be communicated to signal processing, control, and/or display elements of the pipe inspection system, such as to CCU 160 (or other coupled electronic computing devices or systems, such as a notebook computer, cellular phones, tablet devices, and the like, not shown), which may be integral with or coupled to the drum reel 120 or may be standalone devices.

Control signals may be generated by CCU 160 and/or other inspection system device(s) for controlling various operations of the camera head 140, such as positioning controls, orientation controls, camera settings, lighting settings, and the like. The CCU 160 may also control various operations of drum reel 120 and/or other wired or wirelessly connected video inspection system devices (not illustrated).

As noted above, video push-cable 110 may carry control signals as well as inspection data signals between camera head 140 and drum reel 120, and may also provide electrical power to camera head 140 from a power source, such as batteries (not illustrated), power generators, power inverters, AC line power, and the like, which may be on or electrically coupled to CCU 160 and/or drum reel 120. Electrical conductors within the video push cable may share provision of power and signaling to minimize cable size and provide other potential advantages. For example, power and signals may be combined on the push-cable and separated at the distal or proximal ends using filters or other electronics.

In an exemplary embodiment, a coaxial video push-cable embodiment, such as video push-cable 110, may be used to provide electrical power as AC power rather than DC power for enhanced operator and environmental safety. Safer operation at higher voltages may, for example, result when providing power at AC frequencies above the traditional 50 or 60 Hz mains frequencies. Although various AC frequencies may be used, in some video inspection system embodiments, higher frequencies than traditional AC mains line frequencies, such as frequencies of multiple kHz, 10s of kHz, or 100s of kHz, may be used to provide power to the camera head. Use of higher frequencies may advantageously allow for higher voltages while at the same time reducing risk of harmful shocks should the video-push cable conductors become damaged or otherwise compromised. Frequencies at which power are provided may further be selected to avoid or reduce interference with video or other data or control signaling either directly or from harmonics of the power fundamental frequency. For example, power signals may be provided at higher voltages using higher frequencies to reduce the potential for user harm due to lower skin penetration of currents at higher frequencies.

In addition, some video inspection systems may require or otherwise benefit from power provided at high frequencies for powering lighting modules or other system devices that use various powering schemes requiring periodic increases in power to light up an inspection area (such as with LEDs disposed in or coupled to a camera head) such as is disclosed in the incorporated applications. Details of examples of such a system are disclosed in co-assigned U.S. Provisional Patent Application Ser. No. 62/077,152, filed Nov. 7, 2014, entitled INSPECTION CAMERA DEVICES AND METHODS WITH SELECTIVELY ILLUMINATED MULTISENSOR IMAGING, the content of which is incorporated by reference herein in its entirety. In such a system, AC power may be provided through a coaxial video push-cable, alone or in combination with images or video signals, to power LEDs in the camera head and/or other circuits, such as camera head electronics, imaging sensors, transmitters or transceivers, power tools or motors, and the like.

Use of AC power at higher frequencies may provide other advantages, such as allowing reduced transformer size, improving efficiency, safer transmission of higher voltages, and the like. Furthermore, a utility locating device, such as utility locator device 170 held by user 180, may use magnetic fields emitted by higher frequency signals applied to a video push-cable to determine and map the location of the coaxial video push-cable 110 by sensing emitted magnetic field signals, such as is described in the incorporated applications. For example, magnetic fields emitting from a push-cable as described herein may be sensed by a corresponding utility locator to allow a user to determine the position of the cable, and corresponding pipe or cavity where the images or video are being captured, at the ground surface.

In some embodiments, video inspection data signals may be communicated to and/or control signals may be provided from other system devices not illustrated in FIG. 1 through a video push-cable such as cable 110. For example, a laptop, smart phone, tablet computer, utility locator device, and/or other electronic computing device may be used to process received images or video, display pipe inspection imagery and/or data, and/or control operations of the various system devices, including camera head 140 as well as other inspection system devices. Coaxial video push-cables as described herein may also be used in other applications where signaling and power are provided from one device to another, such as to provide power, particularly at higher AC frequencies, to cutting tools or other powered tools or devices.

A pipe inspection system that includes a coaxial video push-cable in accordance with aspects of the present disclosure, such as video push-cable 110 of video pipe inspection system 100, may further include additional elements not specifically shown in FIG. 1. These additional elements may be any of the various video inspection system or utility locator system devices or elements as described in the various referenced patents and patent applications incorporated herein. For example, as shown in FIG. 1, a utility locator 170 may be used in conjunction with a video pipe inspection system to determine a location, relative to the ground surface, of the camera head 140 based on magnetic field signals generated from the camera head, or from other magnetic field sources, such as from current flowing in wires in the coaxial video push-cable or buried pipe or other conductors, or through sondes on or in the camera head or otherwise coupled to the push-cable. This may be done by, for example, incorporating a sonde (not shown) with the video push-cable or camera head, with corresponding sonde dipole magnetic field signals sensed and processed by the locator to locate the camera head or push-cable at the ground surface.

Figure 2:
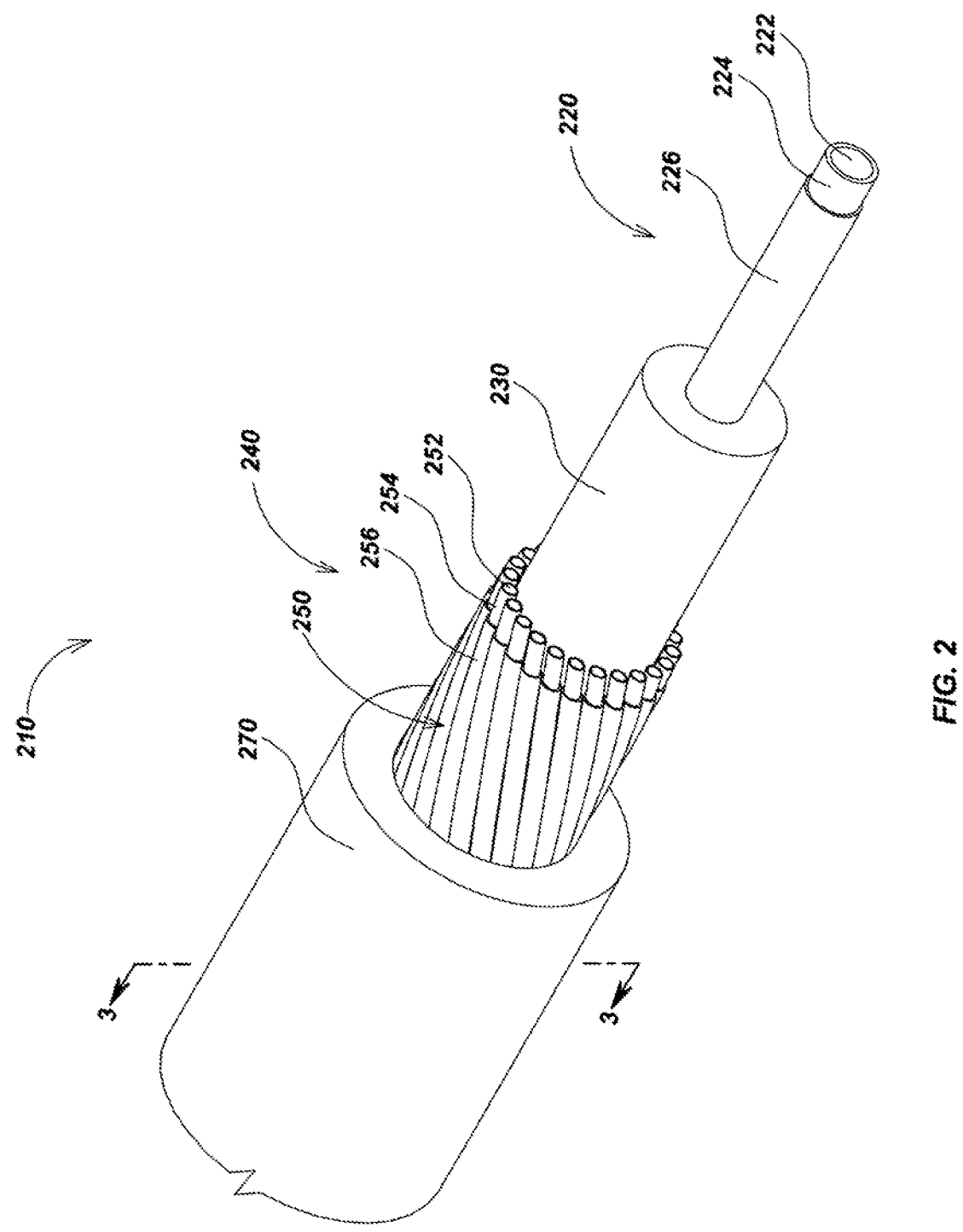
FIG. 2 is a detailed fragmentary isometric view of one embodiment of a coaxial video push-cable.
Figure 3:
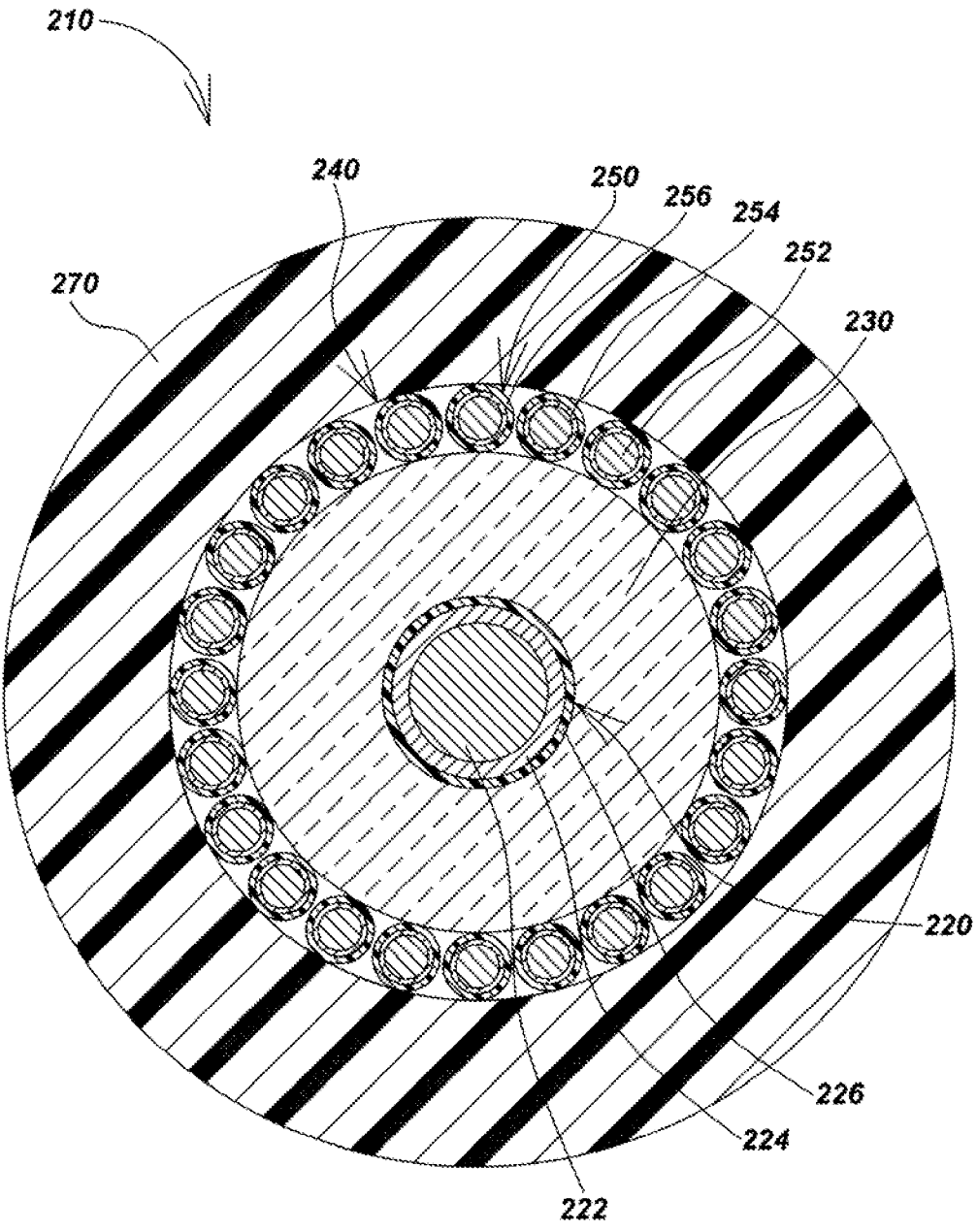
FIG. 3 is a cross-section view of the coaxial video push-cable embodiment of FIG. 2, taken along line 3-3.

Turning to FIGS. 2 and 3, an exemplary embodiment 210 of details of a coaxial video push-cable is illustrated. This push-cable embodiment may correspond to the video push-cable 110 of the system shown in FIG. 1. As shown in FIG. 2, video push-cable 210 may include a coaxial structure with one or more inner conductors 220, which may be a single material or single wire conductor or, in some embodiments, may comprise an inner tubular conductor including a structural core element 222 and an outer or cladding conductive element 224. In other embodiments, inner conductor 220 may comprise a mesh material, Litz wire, or other conductive element configurations (not shown). Inner conductor 220 may also include an optional electrical and/or fluid ingress insulation layer 226 (e.g., to provide electrical isolation and/or to aid in limiting fluid ingress to inner conductor layers to reduce oxidation/corrosion for push-cables that are used in wet and/or corrosive environments such as sewer or other liquid pipes, etc.).

Push-cable 210 may further comprise an insulating dielectric layer 230, forming an insulating and dielectric element of the coaxial push-cable between inner and outer conductors, and an outer partially flexible structural element, which may, in an exemplary embodiment, comprise an outer structural-only array or outer structural and conductive array (functioning as a partially flexible structure and which may further function as an outer or shield conductor layer as in a traditional coaxial cable). The outer structural element may be of tubular structural elements or tubular conductors to function as an outer conductor or shield with respect to the inner conductor(s).

Figure 4:
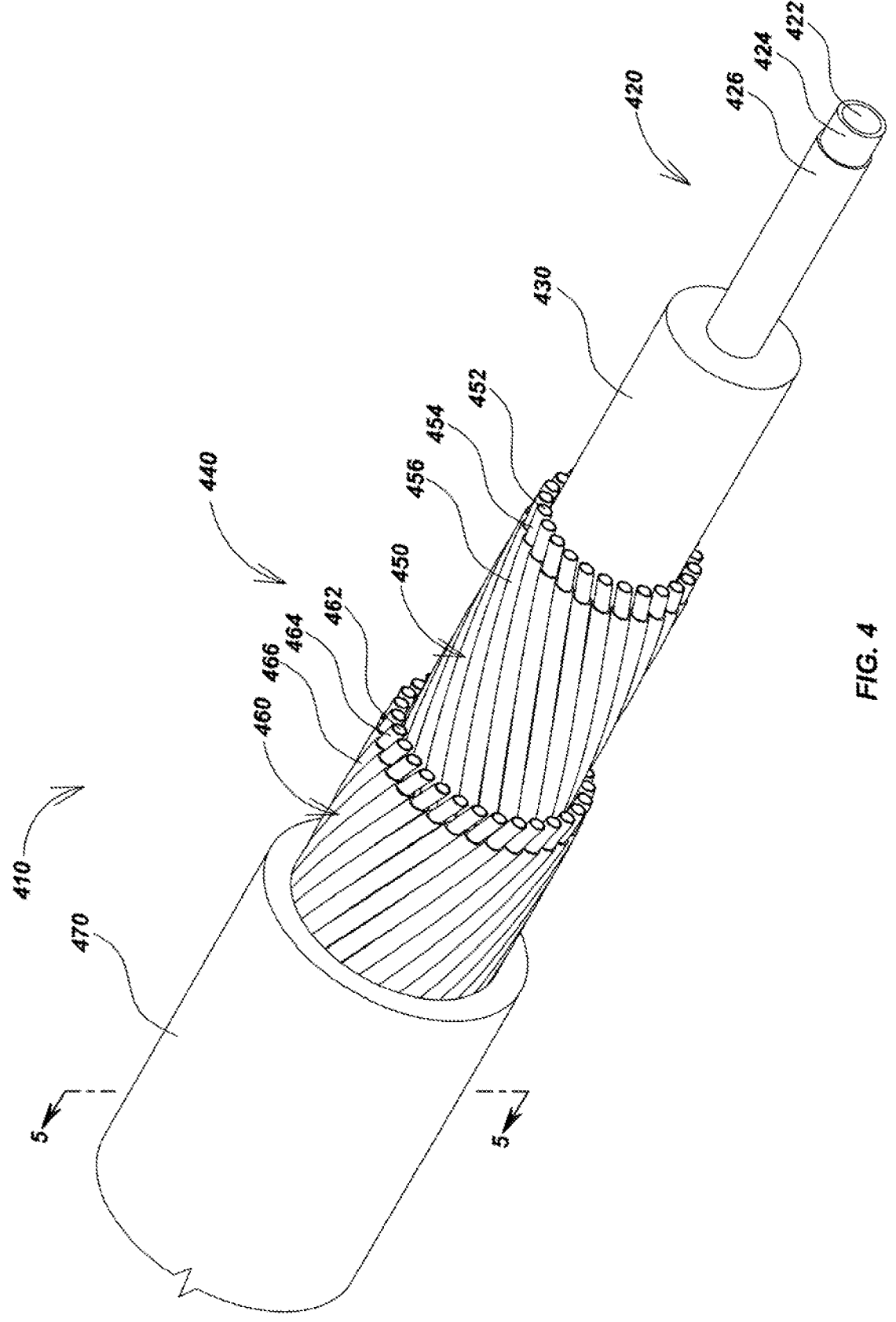
FIG. 4 is a detailed fragmentary isometric view of another embodiment of a coaxial video push-cable in accordance with certain aspects.

In an exemplary embodiment where the outer partially flexible structural element acts as a conductor or conductive shield as well as partially flexible longitudinal structure, each element of the outer partially flexible structural element may include multiple instances of single material conductors or multiple instances of tubular conductors, with the configuration denoted as a conductive array for brevity. In an exemplary embodiment, each tubular conductor comprises a structural core element 252 and an outer or cladding conductive element 254, which may be similar to those used in the inner conductor but of smaller diameter, and which may be disposed in one or more layered arrays. For example, the outer conductor array may, in some embodiments, be a single layer array as shown in FIG. 2, which may be helically wound as shown, or may be a multi-layer array in alternate embodiments such as shown in the embodiment of FIG. 4, with each layer helically wound and alternate layers wound in opposite directions.

Figure 9:
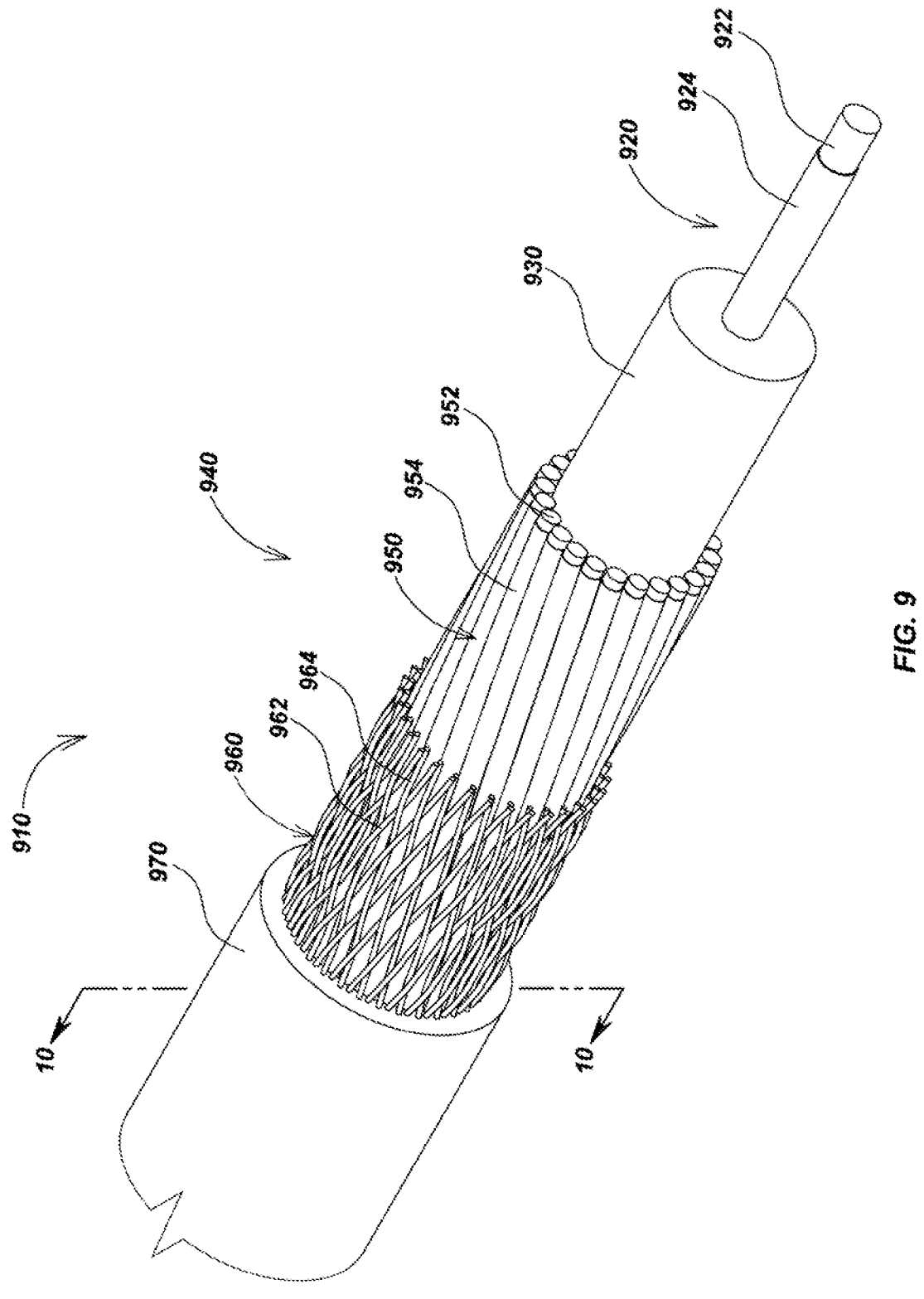
FIG. 9 is a detailed fragmentary isometric view of another embodiment of a coaxial video push-cable in accordance with certain aspects.

As noted above, in some embodiments the outer array may be purely structural in configuration and function, whereas in other embodiment the outer array may be an outer conductor array providing both structural and electrical conductor functionality, typically corresponding to an outer or shield layer of a traditional coaxial cable. In addition, in some embodiments, additional outer conductive elements, such as conductive braid materials or jackets (e.g., as shown in the embodiment of FIG. 9 as element 960) or other partially flexible conductive materials such as conductive sheets, tubes, etc., may be used by themselves or may be electrically coupled to the outer array to provide additional electrical conductivity in various embodiments.

For example, in some embodiments, the outer partially flexible structural element may be used as an outer shield or conductor to carry current for power transmission and/or video or imaging signals as an outer conductive array. In alternate embodiments, an additional outer conductive layer or structure (e.g., as shown in FIG. 9) may be used separately as a conductor or, in some embodiments, may be electrically coupled to the outer partially flexible structural element to carry power and/or signals. In the illustrated exemplary embodiment the outer partially flexible structural element comprises tubular conductors as shown that are helically wound about the insulating element 230 and that carry current and/or video and/or imaging signals; however, in alternate embodiments other elements and configurations that provide both axially rigidity for allowing for pushed deployment of the push-cable into a pipe or cavity, along with partial flexibility for allowing the push-cable to bend around turns, bends, or obstructions in the deployed pipe or cavity, may also be used.

Within the video push-cable embodiment 210, the inner conductor 220 may comprise a single conductive material or may comprise a tubular conductor. For example, a tubular conductor may include two or more elements, one or both of which may be conductive. In an exemplary embodiment the inner conductor 220 may comprise a structural core or strengthening element 222 for providing longitudinal strength to the push-cable, and a conductive cladding or outer layer 224 to provide a high conductivity electrical path, particularly for higher frequency signals that flow primarily in the outer area of the conductor due to skin effect. In some embodiments the structural core may be of a non-conductive or relatively low conductivity material (e.g., certain structural or spring wire steel alloys, etc.), whereas in other embodiments the structural core may be of a higher conductivity material such as higher conductivity steel or other metallic, polymer, or other materials providing longitudinal strength with some flexibility before breakage.

During operation, power and/or signals may flow "outbound" in the inner conductor 220 (and at higher frequencies, primarily in the outer layer or cladding 224) and return through the outer conductor array or other outer conductor element (it is noted that the sense of "outbound" and "return" current is provided solely for explanation—it is apparent that AC current will flow in both directions within the inner conductor and outer conductor array).

In applications where power is provided via the push-cable at higher AC frequencies, most of the power current flow will be towards the outer surface of the inner conductor due to the well-known skin effect. Therefore, the inner conductor may be configured as shown in FIG. 2 with a structural core of a strengthening material such as steel (which may have a relatively low electrical conductivity), and an outer layer bonded layer or cladding of a high electrical conductivity material, such as a copper, for carrying current with a minimum of resistive loss. It is noted that, although the inner conductor is typically positioned at or near the center of the push-cable as shown in FIG. 3 (when viewed in cross-section), it need not be exactly in the center in some embodiments, but rather, is positioned somewhere within the outer conductor array so as to form an approximately coaxial structure.

In inner conductor 220, both cladding or outer layer 224 and structural core element 222 may optionally be enclosed by an insulating layer 226 as shown. The structural core 222 may, for example, be a structural steel wire with a cladding or plating 224 of copper or a copper alloy, or other high electrical conductivity materials or alloys of materials such as silver, gold, aluminum, graphene, nanostructure materials, and the like. In this configuration, when AC currents of higher frequencies flow in inner conductor 220, the current flow will be distributed primarily in the conductive outer or cladding layer, which has higher electrical conductivity, and therefore lower resistive loss, due to the skin effect. Consequently, the structural core of the inner conductor can be of a lower conductivity but higher strength material (and may be chosen as a primarily structural material rather than a high electrical conductivity material). In some embodiments, the structural core may be of a lightweight but high axial strength material that may be an insulator, such as fiberglass, carbon fiber, metallic fiber materials, plastics, and the like.

In some embodiments, there may be multiple conductive elements in the inner conductor, rather than the single inner conductor 220 as shown in FIG. 2. For example, in some embodiments multi-strand wires may be used, such as Litz wire or other multi-conductor wire types for carrying higher frequency signaling and power. In some embodiments the inner conductor 220 may include multiple copper clad steel wires (or other conductor types as described herein) within the dielectric layer 230 to form a central or inner conductor array (not shown). In addition, multiple instances of inner conductors may be used to provide additional electrical or optical circuits.

In an exemplary embodiment, the inner conductor 220 may comprise an insulated copper-clad steel wire 222 (having lower conductivity relative to the outer layer) within a high conductivity cladding layer 224 (e.g., of copper, silver, etc.), both of which may be within an optional insulating layer 226. The insulating layer 226 of the inner conductor 220 may comprise polyimide quad-film or other comparable electrical insulating material(s).

Insulating dielectric layer 230 may surround the inner conductor 220 (or, in instances with multiple inner conductors, may be disposed around the inner conductors) as shown. The dielectric layer 230 surrounding the inner conductor 220 may be of a single material type or multiple material types, and, in an exemplary embodiment, may comprise a fiberglass or other longitudinal strength material having partial flexibility. In an exemplary embodiment the insulating layer may comprise a tubular dielectric material, such as in the form of a hollow tubular shape to provide axial stiffness and strength for forcing the coaxial video push-cable 210 within a pipe or other void, such as within pipe 130 as illustrated in FIG. 1. In some embodiments, Kevlar® and/or other synthetic fibers or similar materials may be used in addition to or in lieu of fiberglass in the dielectric layer.

An outer conductor array 240, which may be comprised of helically wound (or axially or otherwise oriented in some embodiments) individual outer conductors 250, may surround the dielectric layer 230 to provide a return current path in the coaxial video push-cable. The outer conductors may be configured similarly to the inner conductors 220, but with a smaller diameter or cross-sectional area. For example, each outer conductor 250 of the outer conductor array may comprise an outer conductor structural core 252 and an outer conductor outer or cladding layer 254. The outer conductor outer layers may be enclosed by an optional outer conductor insulating layer 256. The insulating layer 256 of the outer conductors 250 may comprise polyimide quad-film or other electrical and/or fluid-ingress insulating materials.

The outer conductors may be wound or otherwise positioned on or about the insulating layer 230. For example, the outer conductors may be helically wound about the dielectric layer as shown in FIG. 2 or, in some embodiments, may be wound longitudinally/axially or in other winding configurations (not shown) that provide longitudinal rigidity with partial flexibility for bending through curves or pipe obstructions.

An outer jacket or layer 270 may encase the outer conductor array, insulating layer, and inner conductor so as to protect and electrically insulate the internal push-cable elements from the external environment, which is often wet, dirty, cold, contaminated, etc. in typical inspection operations.

The structural cores 222 and/or 252 may comprise a high strength steel, such as an HSLA alloy, plano wire, etc., thereby adding to the overall strength and durability of the coaxial video push-cable 210. Other high strength materials may be combined with steel or other metals in the core, such as fibers, composites, nanostructured materials, and the like. Optional insulating layers 226 and/or 256 may be used to mitigate shorting should the dielectric layer 230 fail and break in use, thereby contributing to the overall durability of the coaxial video push-cable 210.

In alternate embodiments, other types of wire or other conductors of varying composition, having varying amounts of strength and conductivity, may be used other than copper-clad steel as discussed herein, such as to provide a lower resistance coaxial cable at a higher cost (assuming higher cost conductive cladding is used), or to otherwise vary cable parameters (e.g., size, cost, electrical losses, operating frequency, etc.) for a particular application. In other embodiments, conductors such as 220 and 250 as shown in FIGS. 2 and 3 may comprise other conductive materials/metals other than copper-clad steel, such as metallic or polymer structural cores with high conductivity metallic or plastic claddings or coatings, or other materials. Furthermore, in some embodiments insulation on particular conductors may be omitted, for example to reduce cost or size and the like.

In the subsequent embodiments, similar elements and configurations may be used. For example, tubular conductors having a structural core and high conductivity cladding or coating as described with respect to embodiment 210 may similar be used. Likewise, outer partially flexible structural/conductive elements may similar be used, such as in the form of conductor arrays as shown with respect to embodiment 210. Similar insulating/dielectric layers and structures may also be used in the various subsequently described embodiments.

Figure 5:
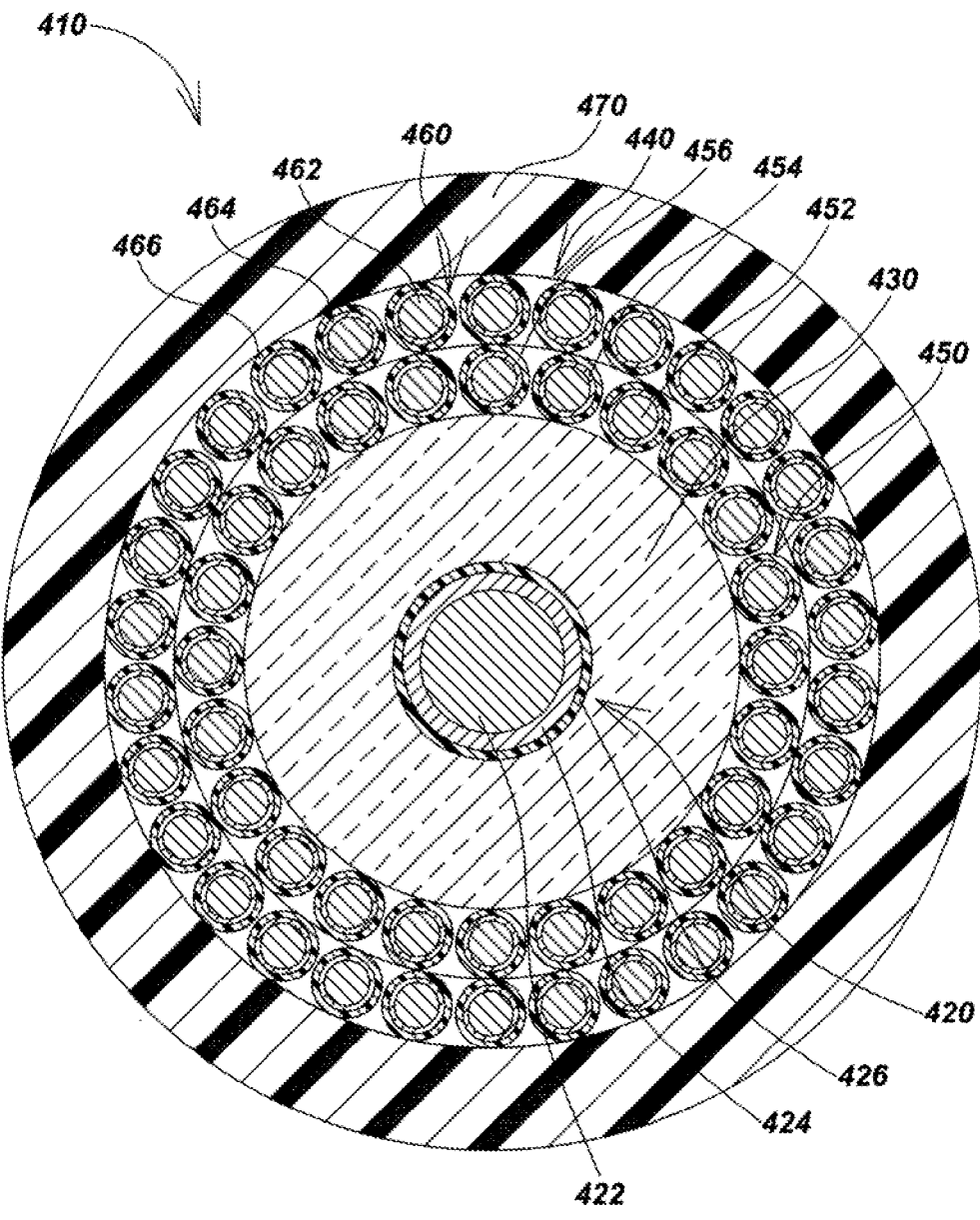
FIG. 5 is a cross-section view of the coaxial video push-cable embodiment of FIG. 4, taken along line 5-5.

For example, turning to FIGS. 4 and 5, another embodiment 410 of a coaxial video push-cable is illustrated. Video push-cable 410 may correspond with push-cable 110 of FIG. 1, and may include similar elements to push-cable embodiment 210 of FIG. 2, but with an additional layer of conductors in the outer conductor array as shown. The structure of conductors, arrays, and other elements of push-cable embodiment 410 may be the same as or similar to corresponding elements of embodiment 210 described previously herein (or other embodiments described subsequently herein).

For example, push-cable embodiment 410 may include an inner or central conductor 420 of a single material conductor or of a tubular conductor, having a structural core 422 and a conductive outer layer 424 of a high electrical conductivity material, both of which may optionally be enclosed within an insulating layer 426. The insulating layer 426 may comprise polyimide quad-film (e.g., Kapton) or other insulating material(s). An insulating dielectric layer or element 430 may surround inner conductor 420, and may comprise fiberglass or other high longitudinal strength material(s). The dielectric layer may provide stiffness and strength needed to force the coaxial video push-cable 410 within a pipe, such as the pipe 130 illustrated in FIG. 1, as well as allowing some amount of flex/bending before breakage. In some embodiments Kevlar® and/or other synthetic fibers or similar materials may be used in addition to or in lieu of fiberglass.

Unlike the single layered outer conductor array 240 illustrated in FIGS. 2 and 3, the video push-cable embodiment 410 of FIGS. 4 and 5 includes a multi-layered outer conductor array 440 comprising a first layer of outer conductors 450 and a second layer of outer conductors 460 about the first layer. The conductors of the outer conductor array may be solid or braided conductors or may be tubular conductors as described with respect to embodiment 210 previously herein. In some embodiments, additional layers (not shown) may also be included, and some embodiments may include multiple inner conductors in an array of the inner conductor (not shown), rather than a single inner conductor. The outer conductors need not be formed in specific layers, but rather, in some embodiments, may be interweaved or otherwise positioned so as to form a cross-sectional thickness greater than that of a single layer of conductors as shown in FIG. 2. In some embodiments the outer conductors may be configured in a first layer helically wound about the insulating/dielectric layer in a first direction and a second layer helically wound in another direction different than the first direction. Subsequent layers may be similarly configured.

For example, the conductors of layers 450 and 460 may each be helically wound about the central rod 430, either in the same or in opposite directions (as shown). In some embodiments the layers may be straight/longitudinal along the cable rather than helically wound as shown. In an exemplary embodiment, the first layer of outer conductors 450 may be wound in a left-handed helical pattern while the second layer 460 may be wound in an opposite right-handed helical pattern, or vice versa. In various other embodiments, the conductors of layers 450 and/or 460 may be wound in a other directions and/or patterns. The layers of conductors in outer layers 450 and 460, when wound in opposition directions, may be torque balanced in bending to improve cable performance and/or structural integrity. Litz or braided conductors may be used in various array configurations in some embodiments.

As with embodiment 210, each conductor of layers 450 and 460 may be individually insulated copper-clad steel such that they may each have a structural core 452 surrounded by an outer higher conductivity layer 454, both of which may be within an optional insulating layer 456. Other structural and outer conductive layer materials may be used in alternate embodiments. The insulating layers 456 and 466 may comprise polyimide quad-film or other comparable insulating materials. In some embodiments, the various layers of inner or outer conductors may use conductors of different types and composition of wires and cladding.

The structural core 422 of inner or central conductor 420, as well as cores 452 and 462 may comprise high strength steel, adding to the overall strength and durability of the video push-cable embodiment 410. The outer high conductivity layers 424, 454, and 464 of each may comprise copper or copper alloys, or other high conductive materials such a silver or tin, allowing communication of signal and transmission of power at higher frequencies via the video push-cable 410. The insulating layers 426, 456, and 466 may reduce the tendency of opposing electromagnetic fields being impressed upon neighboring wires of the outer conductors of layers 450 and 460, and the inner conductor wire 420, thereby reducing power losses in high-frequency use. The insulating layers 426, 456, and 466 of, for example, polyimide or other films, may mitigate shorting should the dielectric layer 430 fail and break in use, thereby contributing to the overall durability of the coaxial video push-cable embodiment 410. An outer jacket 470 may encase the inner conductor 420, dielectric layer 430, and outer conductor array 440 so as to protect and electrically insulate the internal components from the external environment.

As noted previously, in alternate embodiments, the inner conductor 420 or conductors of layers 450 and/or 460, as illustrated in FIGS. 4 and 5, may comprise other conductive metals or other materials besides copper-clad steel. In some embodiments, one or more of the conductors need not be insulated.

Figure 6:
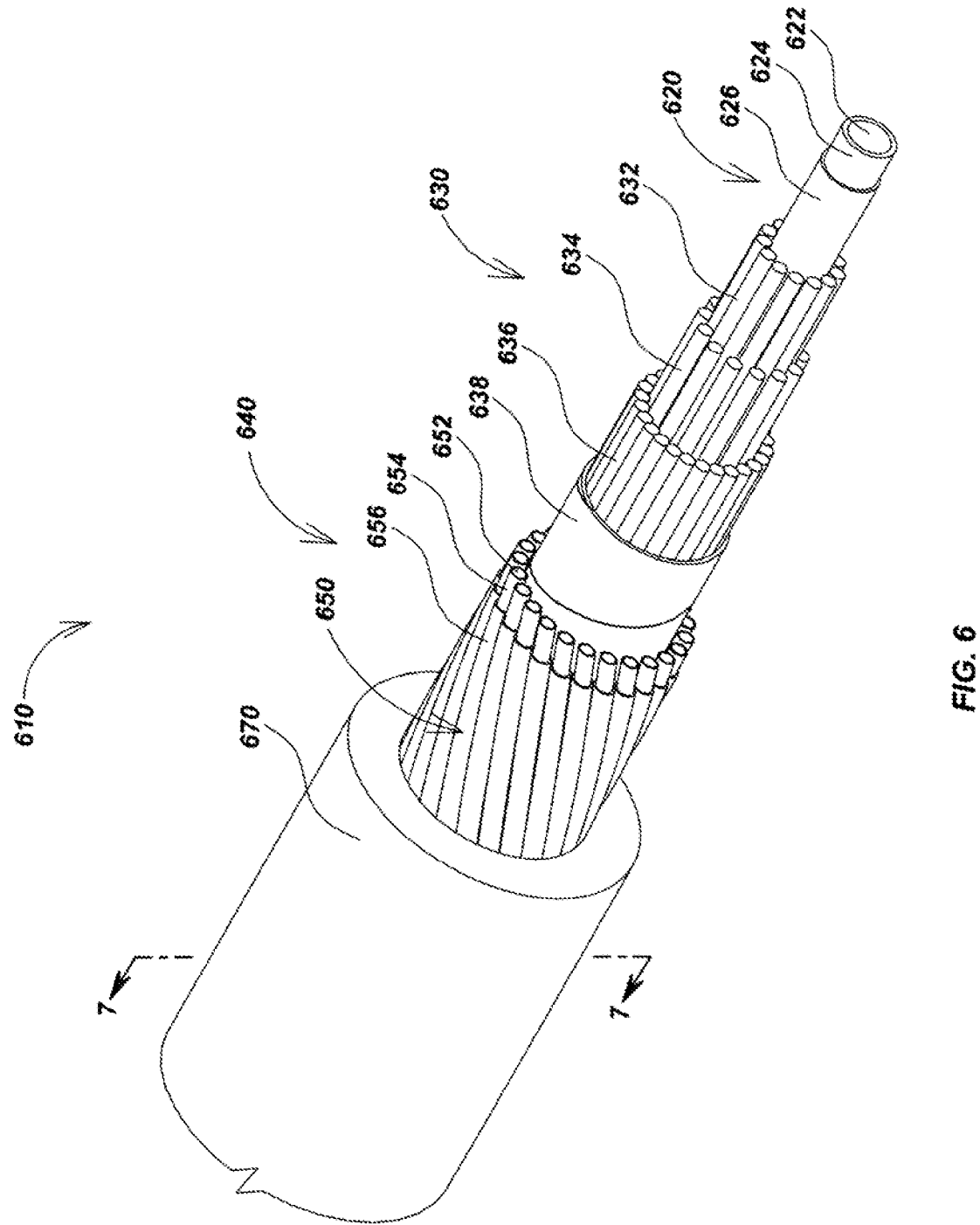
FIG. 6 is a detailed fragmentary isometric view of another embodiment of a coaxial video push-cable in accordance with certain aspects.
Figure 7:
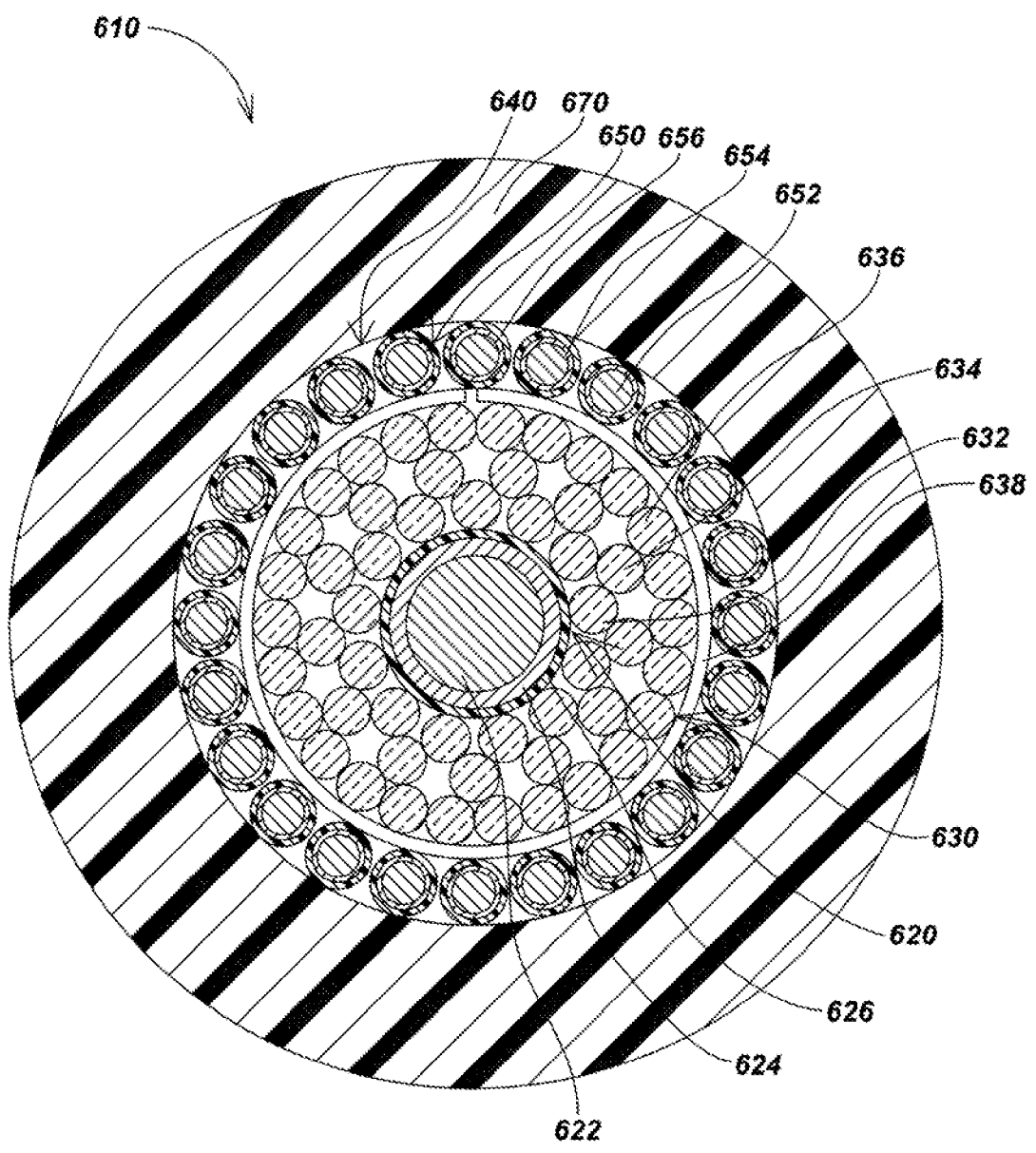
FIG. 7 is a cross-section view of the coaxial video push-cable embodiment of FIG. 6, taken along line 7-7.

Turning to FIGS. 6 and 7, details of another embodiment 610 of a coaxial video push-cable in accordance with certain aspects is illustrated. Push-cable embodiment 610 may correspond with push-cable 110 of FIG. 1, and may be configured similarly to the push-cable embodiments 210 and/or 410 as described previously herein, but also including a dielectric rod assembly as shown in FIG. 6, rather than a single hollow tube as shown in embodiments 210 and 410. The structure of conductors and other elements of push-cable embodiment 610 may be the same as or similar to corresponding elements of embodiments 210 and 410 described previously herein. For example, the outer conductor array of embodiment 610 may be a single layer of conductors as in embodiment 210 or, alternately, two or more layers of conductors as in embodiment 410 (not shown in FIG. 6).

Centrally within the coaxial video push-cable embodiment 610, an inner or central conductor 620 may be disposed within an insulating dielectric layer 630. As with inner conductor 220, inner conductor 620 may be an insulated copper-clad steel wire having a structural core 622 surrounded by a higher conductivity outer layer 624, both of which may be within an optional insulating layer 626. The insulating layer 626 may comprise polyimide quad-film or other comparable insulating material(s). Other materials and configurations as described elsewhere herein may also be used in various embodiments.

Figure 8:
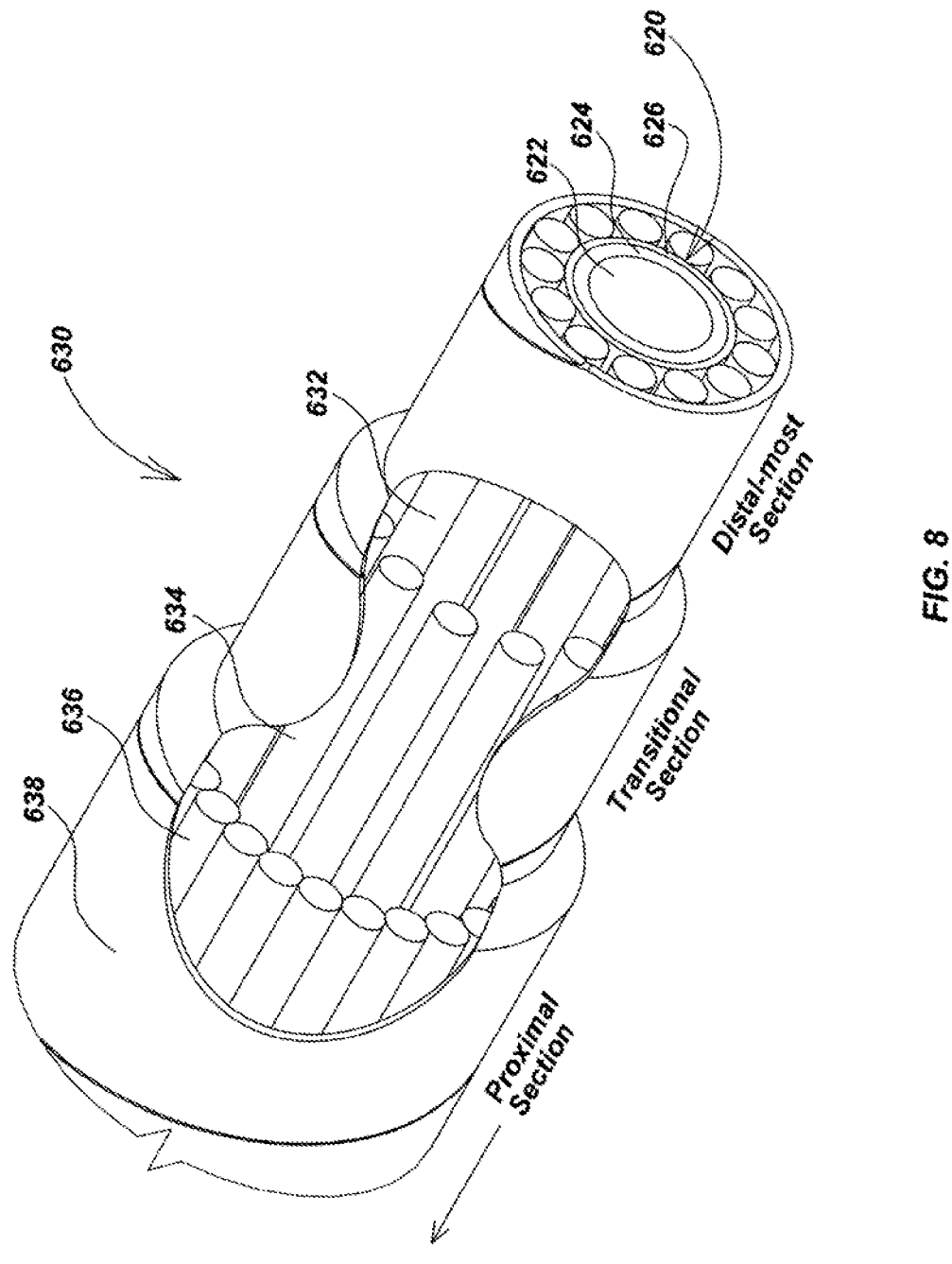
FIG. 8 is an isometric view of details of aspects of the coaxial video push-cable embodiment of FIG. 6, showing a portion of the outer tape cut away to reveal various layers of rods of an insulating dielectric layer.

Details of certain aspect of the insulating dielectric layer embodiment 630 are best illustrated in FIG. 8. Unlike the dielectric layer 230 of FIG. 2 or dielectric layer 430 of FIG. 4, dielectric layer 630 may be comprised of an array of sets of individual rods. The rods may be the same length, however, in an exemplary embodiment the overall cross-sectional area of the dielectric layer may be varied across the length of the push-cable. The rods may be bound together in some embodiments, such as, for example, rods 632, 634, and 636, shown bound together via tape 638 in FIG. 8. The rods 632, 634, and 636 may be of different lengths and/or staggered, such that rods 632 are the longest or first set of rods, rods 636 are the shortest or third set of rods, and rods 634 may be of an intermediate length between that of rods 632 and 636 or second set of rods. The cross-sectional area of the dielectric layer may be varied by using rods of different lengths, or through other configurations, such as by varying the size of the rods, tapering the rods or bundles of rods, etc. The rods may be arranged in layers as shown or, in some embodiments, may be interweaved or otherwise arranged so as to vary flexibility at different portions of the push-cable across its length.

For example, in video push-cable embodiment 610, all three layers of rods 632, 634, and 636 may be arranged in proximal end section of push-cable 610 near where the video push-cable 610 is dispensed from a drum reel, such as the drum reel 120 of FIG. 1, to form the largest cross-sectional area of the push-cable 610 at the proximal end. This part of the push-cable will have the least amount of flexibility/ greatest rigidity due to the number of rods used. A transitional section of push-cable 610, located between the proximal and distal-most sections, may be of reduced cross-sectional area to only include rods 634 and 636 so at to provide more flexibility than the proximal end, but less than the distal end. The distal-most section may include only rods 632 so that it flexes with greater ease than the proximal section containing rods 632, 634, and 636. Various other cross-sectional diameter/area variations may be used in alternate embodiments to tailor a particular push-cable to the flexibility needs of a particular application.

As noted above, the distal-most section of push-cable 610 may include only rods 632, which may be in a short section of the push-cable nearest the camera head (e.g., near camera head 140 of FIG. 1), and may flex with greater ease than either the midsection (containing rods 632 and 634) or the proximal section (containing rods 632, 634, and 636). The greater ease by which the distal-most section flexes may allow video push-cable 610 to better traverse bends and turns within a pipe or other inspection area, while also benefiting from the stiffness and strength of the proximal section to push it into the pipe. The proximal section, containing all three lengths of rods 632, 634, and 636, typically comprises most of the length of the video push-cable.

Other mechanisms may be used to vary the cross-sectional area of the dielectric layer and/or other layers of the push-cable to provide varying flexibility/stiffness along the length of the push-cable in alternate embodiments in lieu of, or in addition to, varying lengths of individual rods as shown in FIGS. 6-8. For example, a video push-cable may achieve varying sections of stiffness by varying the lay length or helical winding angle of the conductors; such as the conductors 250 of FIGS. 2 and 3, the conductors of layers 450 and 460 of FIGS. 4 and 5, and the conductors 640 of FIGS. 6 and 7. In such embodiments, a tighter helical winding angle of conductors having a shorter lay length may create increased stiffness, whereas a wider helical winding angle may resulting in a longer lay length, allowing the video push-cable to bend and flex more freely. Varying lay length/ angle may be used to create any number of sections within a video push-cable with differing degrees of stiffness/flexibility.

In yet further embodiments, a coil spring, such as the coil spring 150 as shown in FIG. 1, may provide similar stiffness varying qualities instead or in addition to one or more of the other stiffness varying methods disclosed herein in alternate embodiments. Example coil springs as may be used in such embodiments are described in, for example, co-assigned U.S. patent application Ser. No. 14/271,255, filed May 6, 2014, entitled SPRING ASSEMBLIES WITH VARIABLE FLEXIBILITY FOR USE WITH VIDEO PUSH-CABLES AND PIPE INSPECTION SYSTEMS, the content of which is incorporated by reference herein in its entirety.

Referring back to FIGS. 6 and 7, an outer conductor array 640 comprising a plurality of helically wound outer conductors 650 may surround the insulating dielectric layer 630. Each conductor 650 may, for example, be individually insulated copper-clad steel having a structural core 652 within a higher conductivity outer layer 654, both of which may optionally be encased in an insulating layer 656. The insulating layer 656 of each individual conductor 650 may comprise polyimide quad-film or other insulating materials.

Tubular conductors such as those described previously herein may be used in various configurations. For example, inner or central conductor 620 may be similar to inner conductors 220 and 420 as described previously herein. The insulating layers 626 and 656 may mitigate shorting should the dielectric layer array 630 fail and break in use, thereby contributing to the overall durability of the video push-cable 610. In alternative embodiments, other types of wire of varying compositions and structures may be used in the various conductors. The conductors may also be wound in different patterns and have varying degrees of strength and conductivity other than the exemplary configuration of copper-clad steel in a single helical pattern as shown in FIG. 6. Furthermore, additional layers of conductors, such as the multilayered conductor array 440 of FIG. 4, may be used in alternative embodiments. Coaxial video push-cable embodiment 610 may include an outer jacket 670 that may encase the inner conductor 620, insulating dielectric layer array 630, and outer conductor array 640 so as to protect and electrically insulate the internal components from the external environment.

In various additional embodiments, one or more additional conductive layers may be used to electrically couple individual outer conductors of the outer conductor array. In such embodiments, the additional conductive layer may be used to provide a more continuous pathway for current through the outer conductor array. Alternately, in some embodiments, the outer partially flexible structural element may be purely structural and not conductive, however, in a typical embodiment the outer partially flexible structural element provides both longitudinal structural strength, partial flexible, and a conductive path for signal and/or power to flow.

Figure 10:
FIG. 10 is a cross-section view of the coaxial video push-cable embodiment of FIG. 9, taken along line 10-10.
Figure 10:
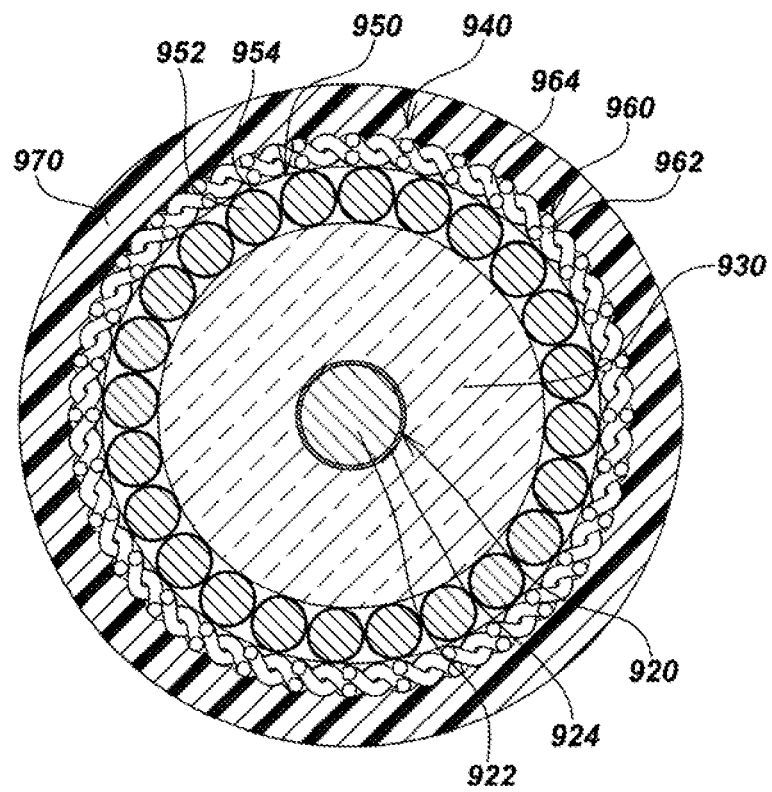

Various embodiments including additional conductive layers are illustrated within the coaxial video push-cable embodiments of FIGS. 9-18. For example, as shown in FIGS. 9 and 10, the coaxial video push-cable embodiment 910 may include an additional conductive layer (e.g. conductive braid or jacket 960 of high electrical conductivity wires or fabric). The video push-cable 910 may include a coaxial conductor structure with an inner or central conductor 920, comprising elements 922 and 924 (and an optional insulator layer), an insulating dielectric element or layer 930, and an outer conductor array 940 (corresponding to an outer or shield conductor layer in a traditional coaxial cable) comprising elements 952 and 954. The outer conductor array 940 may be a single layer array as shown in FIGS. 9 and 10, or a multi-layer array as shown in the embodiment of FIG. 4.

Within the coaxial video push-cable 910, the inner conductor 920 may comprise a single material conductor or may provide a tubular conductor such as described previously. For example, the tubular conductor may include two or more components, with a structural core or strengthening layer 922 and a cladding or outer layer 924.

During operation, power and/or signals may flow "outbound" in the inner conductor 920 (and at higher frequencies, primarily in the outer layers 954 and/or 960) and return through the outer conductor array or other outer conductor element (it is noted that the sense of "outbound" and "return" current is provided solely for explanation-it is apparent that AC current will flow in both directions within the inner conductor and outer conductor array)

In applications where power is provided via the push-cable at higher AC frequencies, most of the current flow will be towards the outer surface of the inner conductor due to the well-known skin effect. In embodiments 910, as well as the other embodiments herein, the structural core diameter and outer or cladding layer diameter may be selected based on the amount of skin effect at a desired operating frequency. For example, as frequency is increased, the size of the outer layer may be decreased due to more current flowing near the periphery. Accordingly, the inner conductor may be made as shown with a structural core of a strengthening material such as steel (which may have a relatively low electrical conductivity), and an outer layer bonded layer or cladding of a high electrical conductivity material, such as a copper or silver, or other high conductivity materials, for carrying current with a minimum of resistive loss. It is noted that although the inner conductor is typically positioned at or near the center of the push-cable as shown in FIG. 10, it need not be exactly in the center in some embodiments, but rather, is positioned somewhere within the outer conductor array so as to form an approximately coaxial structure.

In some embodiments, multiple conductive elements in the inner conductor, rather than the single inner conductor 920 as shown in FIGS. 9 and 10, may be used (e.g., as in Litz wire or other multi-conductor wire types for carrying higher frequency signaling and power). For example, in some embodiments the inner conductor 920 may include multiple copper clad steel wires (or other conductor types as described herein) within the dielectric layer 930 to form a central or inner conductor array (not shown). Steel or other metals may be combined with synthetic materials, fibers, etc., in alternate structural core embodiments.

In an exemplary embodiment, the inner conductor 920 may comprise an insulated copper-clad steel wire 922 (having lower conductivity relative to the cladding layer) within a higher conductivity cladding layer 924 (e.g., of copper, silver, etc.), both of which may be within an optional insulating layer (not illustrated). The insulating layer of the inner conductor 920 may comprise polyimide quad-film (Kapton) or other comparable insulating material(s).

Insulating dielectric layer or element 930 may surround the inner conductor 920 as shown. The dielectric layer 930 surrounding the inner conductor 920 may be a single element, and in an exemplary embodiment may be a fiberglass or other synthetic fibers, or other high-strength materials. The dielectric element may be in the form of a hollow tubular shape to provide stiffness and strength for forcing the coaxial video push-cable 910 within a pipe or other void, such as within pipe 130 as illustrated in FIG. 1. In some embodiments, Kevlar® and/or other similar synthetic fibers may be used in addition to or in lieu of fiberglass in the dielectric layer.

An outer conductor array 940, which may be comprised of helically wound (or otherwise oriented) individual outer conductors 950, may surround the dielectric layer 930 to provide the return current path in the coaxial video push-cable. The outer conductors 950 may be structured similarly to the inner conductors 920, but with a smaller diameter or cross-sectional area. For example, each outer conductor 950 of the outer conductor array may comprise a structural core 952 and an outer conductor outer or cladding layer 954. The outer conductors 950 may be wrapped onto the dielectric layer 930. The outer conductors 950 may be helically wound about the dielectric layer as shown in FIGS. 9 and 10 or, in some embodiments, may be wound longitudinally or in other winding or placement configurations (not shown).

Within video push-cable embodiment 910, a conductive jacket 960 may enclose and contact the conductive cladding layer 952 on each individual outer conductor 950 of the outer conductor array 940. The conductive jacket 960, comprising of multiple individual wires 962 and/or other such conductive element or elements, may be wrapped about the outer conductor array 940 in a braided or other arrangement providing contact between cladding layers 952 and conductive jacket thereby further providing a more continuous current pathway where gapping between individual outer conductors 950 may exist. The individual wires 962 of the conductive jacket 960 may be of high electrical conductivity materials (e.g. copper, copper alloy, silver, silver alloy or the like).

An outer jacket or layer 970 may encase the outer conductor array, dielectric layer, and inner conductor so as to protect and electrically insulate the internal push-cable elements from the external environment, which is often wet, dirty, cold, contaminated, etc. in typical inspection operations.

The structural cores 922 and 952 may comprise a high strength steel, such as an HSLA alloy, plano wire, etc., thereby adding to the overall strength and durability of the coaxial video push-cable 910. Other high strength materials may be combined with steel or other metals in the core, such as fibers, composites, nanostructured materials, and the like. Optional insulating layers may be used to mitigate shorting should the dielectric layer 930 fail and break in use, thereby contributing to the overall durability of the video push-cable 910.

In alternate embodiments, other types of wire or other conductors of varying composition, having varying amounts of strength and conductivity, may be used other than copper-clad steel as discussed herein, such as to provide a lower resistance coaxial cable at a higher cost (assuming higher cost conductive cladding is used), or to otherwise vary cable parameters (e.g., size, cost, electrical losses, operating frequency, etc.) for a particular application. For example, in other embodiments, conductors such as 920, 950, and 960 as shown in FIGS. 9 and 10 may comprise other conductive materials/metals.

Figure 11:
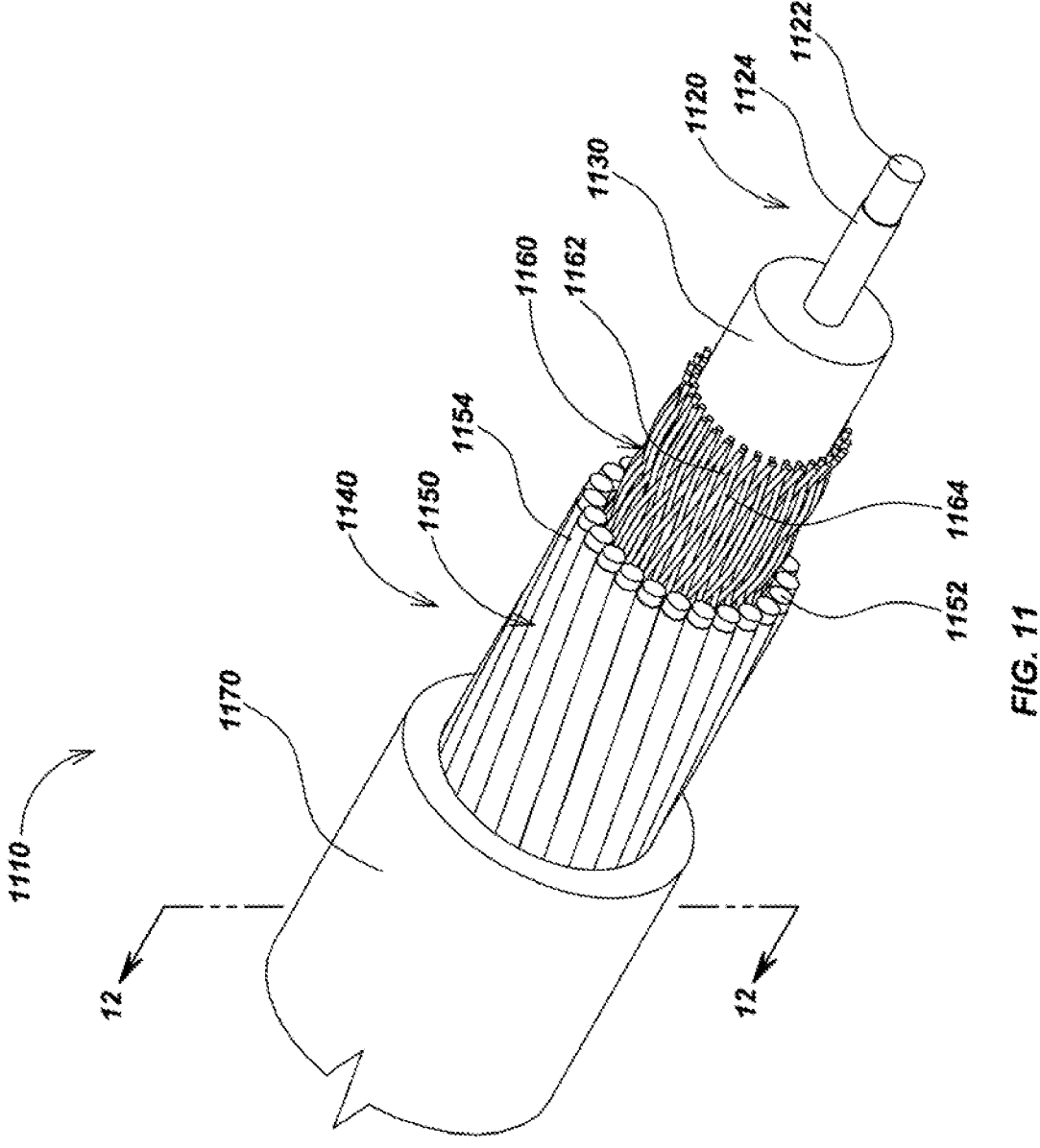
FIG. 11 is a detailed fragmentary isometric view of another embodiment of a coaxial video push-cable in accordance with certain aspects.
Figure 12:
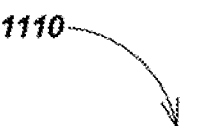
FIG. 12 is a cross-section view of the coaxial video push-cable embodiment of FIG. 11, taken along line 12-12.
Figure 12:
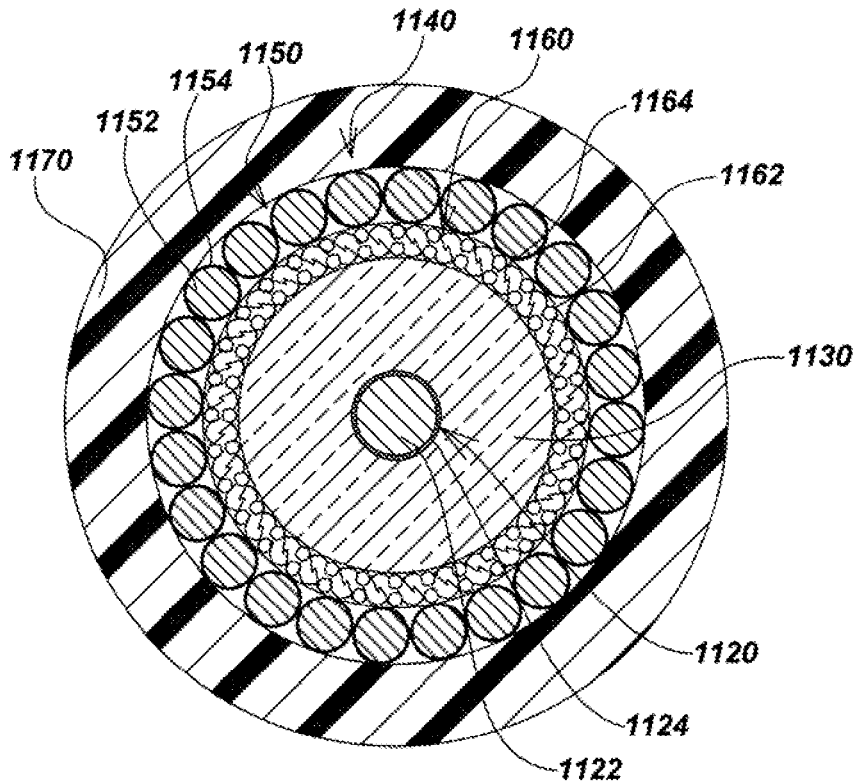

Furthermore, in some embodiments insulation on particular conductors may be omitted, for example to reduce cost or size and the like. In some embodiments, an additional conductive layer may be positioned beneath the outer conductor array such as to provide a more continuous current pathway where gapping between individual outer conductors may exist. As shown in FIGS. 11 and 12, the video push-cable 1110 may be such an embodiment where an additional conductive layer, conductive jacket 1160, may be positioned beneath the outer conductor array 1140 and enclosing the dielectric layer 1130.

The video push-cable embodiment 1110 of FIGS. 11 and 12 may include a coaxial conductor structure with an inner or central conductor 1120, comprising elements 1122 and 1124 (along with an optional insulator layer), an insulating dielectric element or layer 1130, and an outer conductor array (corresponding to an outer or shield conductor layer in a traditional coaxial cable) comprising elements 1152 and 1154. The outer conductor array 1140 may be a single layer array as shown in FIGS. 11 and 12, or a multi-layer array as shown in the embodiment of FIG. 4.

Within the coaxial video push-cable 1110, the inner conductor 1120 may comprise a single material or a tubular conductor such as described elsewhere herein. For example, the tubular conductor may include two or more conductive components, with a structural core or strengthening layer 1122 and a cladding or outer layer 1124 of a high electrical conductivity material.

During operation, power and/or signals may flow "outbound" in the inner conductor 1120 (and at higher frequencies, primarily in the outer layers 1150 and/or 1160) and return through the outer conductor array or other outer conductor element (it is noted that the sense of "outbound" and "return" current is provided solely for explanation-it is apparent that AC current will flow in both directions within the inner conductor and outer conductor array).

As noted previously herein, in applications where power is provided via the push-cable at higher AC frequencies, most of the current flow will be towards the outer surface of the inner conductor due to the well-known skin effect. Therefore, the inner conductor may be made as shown with a structural core of a strengthening material such as steel (which may have a relatively low electrical conductivity), and an outer bonded layer or cladding of a high electrical conductivity material, such as a copper, for carrying current with a minimum of resistive loss. It is noted that although the inner conductor is typically positioned at or near the center of the push-cable as shown in FIG. 12, it need not be exactly in the center in some embodiments, but rather, is positioned somewhere within the outer conductor array so as to form an approximately coaxial structure.

In some embodiments, multiple conductive elements in the inner conductor, rather than the single inner conductor 1120 as shown in FIGS. 11 and 12, may be used (e.g., as in Litz wire or other multi-conductor wire types for carrying higher frequency signaling and power). For example, in some embodiments the inner conductor 1120 may include multiple copper clad steel wires (or other conductor types as described herein) within the dielectric layer 1130 to form a central or inner conductor array (not shown).

In an exemplary embodiment, the inner conductor 1120 may comprise an insulated copper-clad steel wire 1122 (having lower conductivity relative to the cladding layer) within a higher conductivity cladding layer 1124 (e.g., of copper, etc.), both of which may be within an optional insulating layer (not illustrated). The insulating layer of the inner conductor 1120 may comprise polyimide quad-film or other comparable insulating material(s).

Insulating dielectric layer or element 1130 may surround the inner conductor 1120 as shown. The dielectric layer 1130 surrounding the inner conductor 1120 may be a single element, and in an exemplary embodiment may be a fiberglass or other high-strength material. The dielectric element may be in the form of a hollow tubular shape to provide stiffness and strength for forcing the coaxial video push-cable 1110 within a pipe or other void, such as within pipe 130 as illustrated in FIG. 1. In some embodiments, Kevlar® and/or other similar synthetic fibers may be used in addition to or in lieu of fiberglass in the dielectric layer.

The dielectric layer 1130 may further be enclosed by a conductive braid or jacket 1160. The conductive jacket 1160, comprising of multiple individual wires 1162 and/or other such conductive element or elements, may be wrapped about the outer dielectric layer 1130 in a braided or other such arrangement to increase contact between the conductive jacket 1160 and the individual outer conductors 1150. The individual wires 1162 of the conductive jacket 1160 may be of high electrical conductivity materials (e.g. copper, copper alloy, silver, silver alloy or the like) and may be electrically coupled to the outer conductor array 1140 to carry current in addition to, or in place of, the outer conductor array.

An outer conductor array 1140, which may be comprised of helically wound (or otherwise oriented) individual outer conductors 1150, may surround the dielectric layer 1130 and conductive jacket 1160 to provide the return current path in the coaxial video cable. The outer conductors 1150 may be structured similarly to the inner conductors 1120, but with a smaller diameter or cross-sectional area. For example, each outer conductor 1150 of the outer conductor array may comprise an outer conductor structural core 1152 and an outer conductor outer or cladding layer 1154. The outer conductors 1150 may be wrapped onto the dielectric layer 1130 and conductive jacket 1160. The outer conductors 1150 may be helically wound about the dielectric layer 1130 and conductive jacket 1160 as shown in FIGS. 11 and 12 or, in some embodiments, may be wound longitudinally (not shown). The conductive jacket 1160 may contact the individual outer conductors 1150 providing a more continuous current pathway where gapping between individual outer conductors 1150 may exist.

An outer jacket or layer 1170 may encase the outer conductor array, dielectric layer, and inner conductor so as to protect and electrically insulate the internal push-cable elements from the external environment, which is often wet, dirty, contaminated, etc. in typical inspection operations.

The structural cores 1122 and 1152 may comprise a very high strength steel, such as an HSLA alloy, plano wire, etc., thereby adding to the overall strength and durability of the coaxial video push-cable 1110. Other high strength materials may be combined with steel or other metals in the core, such as fibers, composites, nanostructured materials, and the like. Optional insulating layers may be used to mitigate shorting should the dielectric layer 1130 fail and break in use, thereby contributing to the overall durability of the video push-cable 1110.

In alternate embodiments, other types of wire or other conductors of varying composition, having varying amounts of strength and conductivity, may be used other than copper-clad steel as discussed herein, such as to provide a lower resistance coaxial cable at a higher cost (assuming higher cost conductive cladding is used), or to otherwise vary cable parameters (e.g., size, cost, electrical losses, operating frequency, etc.) for a particular application. In other embodiments, conductors such as 1120, 1150, and 1160 as shown in FIGS. 11 and 12 may comprise other conductive materials/metals. Furthermore, in some embodiments insulation on particular conductors may be omitted, for example to reduce cost or size and the like.

Figure 13:
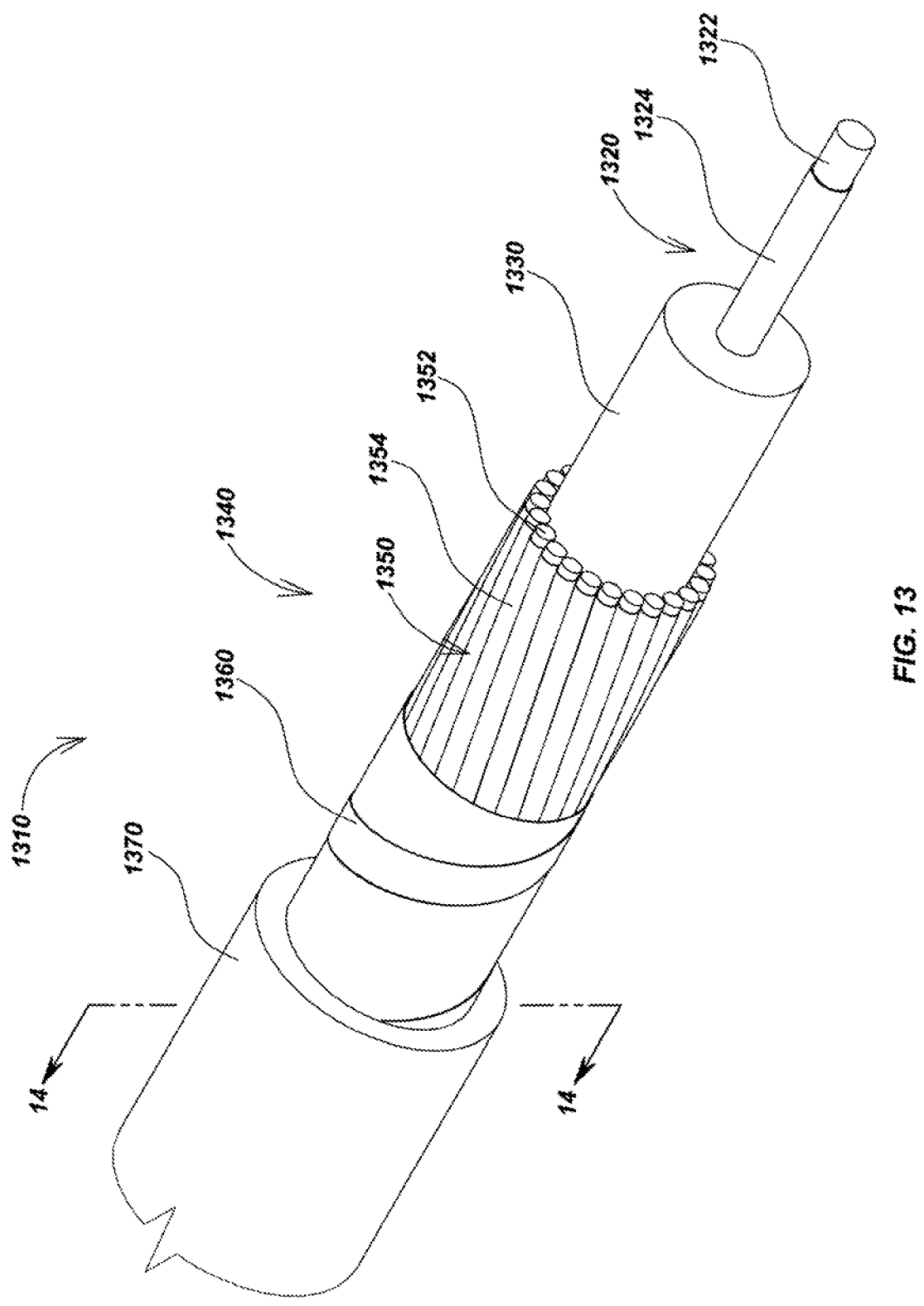
FIG. 13 is a detailed fragmentary isometric view of another embodiment of a coaxial video push-cable in accordance with certain aspects.
Figure 14:
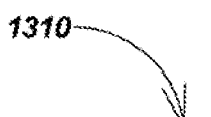
FIG. 14 is a cross-section view of the coaxial video push-cable embodiment of FIG. 13, taken along line 14-14.
Figure 14:
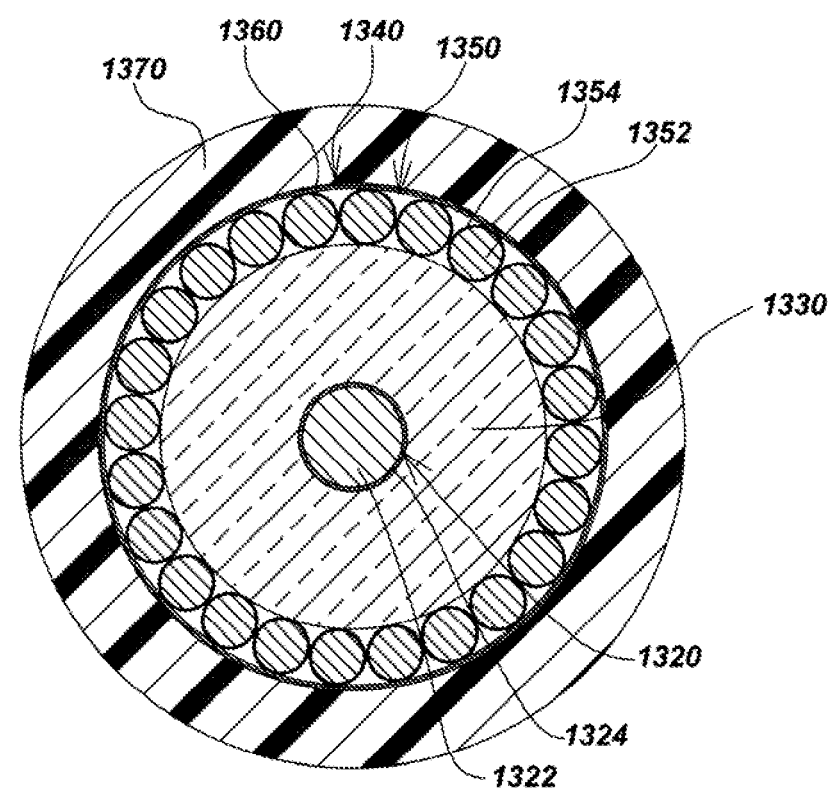

Turning to FIGS. 13 and 14, another push-cable embodiment 1310 is illustrated having a conductive tape layer 1360 as an additional conductive layer. The conductive tape layer 1360, comprising of conductive tape, may be wound about an outer conductor array 1340.

The video push-cable 1310 may include a coaxial conductor structure with an inner or central conductor 1320, which may be a conductor of a single material or a tubular conductor such as described elsewhere herein. The tubular conductor may comprise elements 1322 and 1324 (and optional insulator layer), an insulating dielectric element or layer 1330, and an outer conductor array (corresponding to an outer or shield conductor layer in a traditional coaxial cable) comprising elements 1352 and 1354. The outer conductor array 1340 may be a single layer array as shown in FIGS. 13 and 14, or a multi-layer array as shown in the embodiment of FIG. 4.

Within the coaxial video push-cable 1310, the inner conductor 1320 may comprise two or more components, with a structural core or strengthening layer 1322 and a cladding or outer layer 1324 of a high electrical conductivity material.

During operation, power and/or signals may flow "outbound" in the inner conductor 1320 (and at higher frequencies, primarily in the outer layers 1350 and/or 1360) and return through the outer conductor array or other outer conductor element (it is noted that the sense of "outbound" and "return" current is provided solely for explanation-it is apparent that AC current will flow in both directions within the inner conductor and outer conductor array).

In applications where power is provided via the push-cable at higher AC frequencies, most of the current flow will be towards the outer surface of the inner conductor due to the well-known skin effect. Therefore, the inner conductor may be made as shown with a structural core of a strengthening material such as steel (which may have a relatively low electrical conductivity), and an outer layer bonded layer or cladding of a high electrical conductivity material, such as a copper, for carrying current with a minimum of resistive loss. It is noted that although the inner conductor is typically positioned at or near the center of the push-cable as shown in FIGS. 14, it need not be exactly in the center in some embodiments, but rather, is positioned somewhere within the outer conductor array so as to form an approximately coaxial structure.

In some embodiments, multiple conductive elements in the inner conductor, rather than the single inner conductor 1320 as shown in FIGS. 13 and 14, may be used (e.g., as in Litz wire or other multi-conductor wire types for carrying higher frequency signaling and power). For example, in some embodiments the inner conductor 1320 may include multiple copper clad steel wires (or other conductor types as described herein) within the dielectric layer 1330 to form a central or inner conductor array (not shown).

In an exemplary embodiment, the inner conductor 1320 may comprise an insulated copper-clad steel wire 1322 (having lower conductivity relative to the cladding layer) within a higher conductivity cladding layer 1324 (e.g., of copper, etc.), both of which may be within an optional insulating layer (not illustrated). The insulating layer of the inner conductor 1320 may comprise polyimide quad-film or other comparable insulating material(s).

Insulating dielectric layer or element 1330 may surround the inner conductor 1320 as shown. The dielectric layer 1330 surrounding the inner conductor 1320 may be a single element, and in an exemplary embodiment may be a fiberglass or other high-strength material. The dielectric element may be in the form of a hollow tubular shape to provide stiffness and strength for forcing the coaxial video push-cable 1310 within a pipe or other void, such as within pipe 130 as illustrated in FIG. 1. In some embodiments, Kevlar® and/or other similar synthetic fibers may be used in addition to or in lieu of fiberglass in the dielectric layer.

An outer conductor array 1340, which may be comprised of helically wound (or otherwise oriented) individual outer conductors 1350, may surround the dielectric layer 1330 to provide the return current path in the coaxial video cable. The outer conductors 1350 may be structured similarly to the inner conductors 1320, but with a smaller diameter or cross-sectional area. For example, each outer conductor 1350 of the outer conductor array may comprise an outer conductor structural core 1352 and an outer conductor outer or cladding layer 1354. The outer conductors 1350 may be wrapped onto the dielectric layer 1330. The outer conductors 1350 may be helically wound about the dielectric layer as shown in FIGS. 13 and 14 or, in some embodiments, may be wound longitudinally (not shown).

Within video push-cable embodiment 1310, the conductive tape layer 1360 may be wrapped about and made to contact the outer conductor array 1340 providing a more continuous current pathway where gapping between individual outer conductors 1350 may exist. The conductive tape layer 1360 may be of highly electrically conductive materials (e.g. copper, copper alloy, silver, silver alloy or the like).

An outer jacket or layer 1370 may encase the outer conductor array, dielectric layer, and inner conductor so as to protect and electrically insulate the internal push-cable elements from the external environment, which is often wet, dirty, cold, contaminated, etc. in typical inspection operations.

The structural cores 1322 and 1352 may comprise a very high strength steel, such as an HSLA alloy, plano wire, etc., thereby adding to the overall strength and durability of the coaxial video push-cable 1310. Other high strength materials may be combined with steel or other metals in the core, such as fibers, composites, nanostructured materials, and the like. Optional insulating layers may be used to mitigate shorting should the dielectric layer 1330 fail and break in use, thereby contributing to the overall durability of the video push-cable 1310.

In alternate embodiments, other types of wire or other conductors of varying composition, having varying amounts of strength and conductivity, may be used other than copper-clad steel as discussed herein, such as to provide a lower resistance coaxial cable at a higher cost (assuming higher cost conductive cladding is used), or to otherwise vary cable parameters (e.g., size, cost, electrical losses, operating frequency, etc.) for a particular application. In other embodiments, conductors such as 1320, 1350, and 1360 as shown in FIGS. 13 and 14 may comprise other conductive materials/metals. Furthermore, in some embodiments insulation on particular conductors may be omitted, for example to reduce cost or size and the like.

Figure 15:
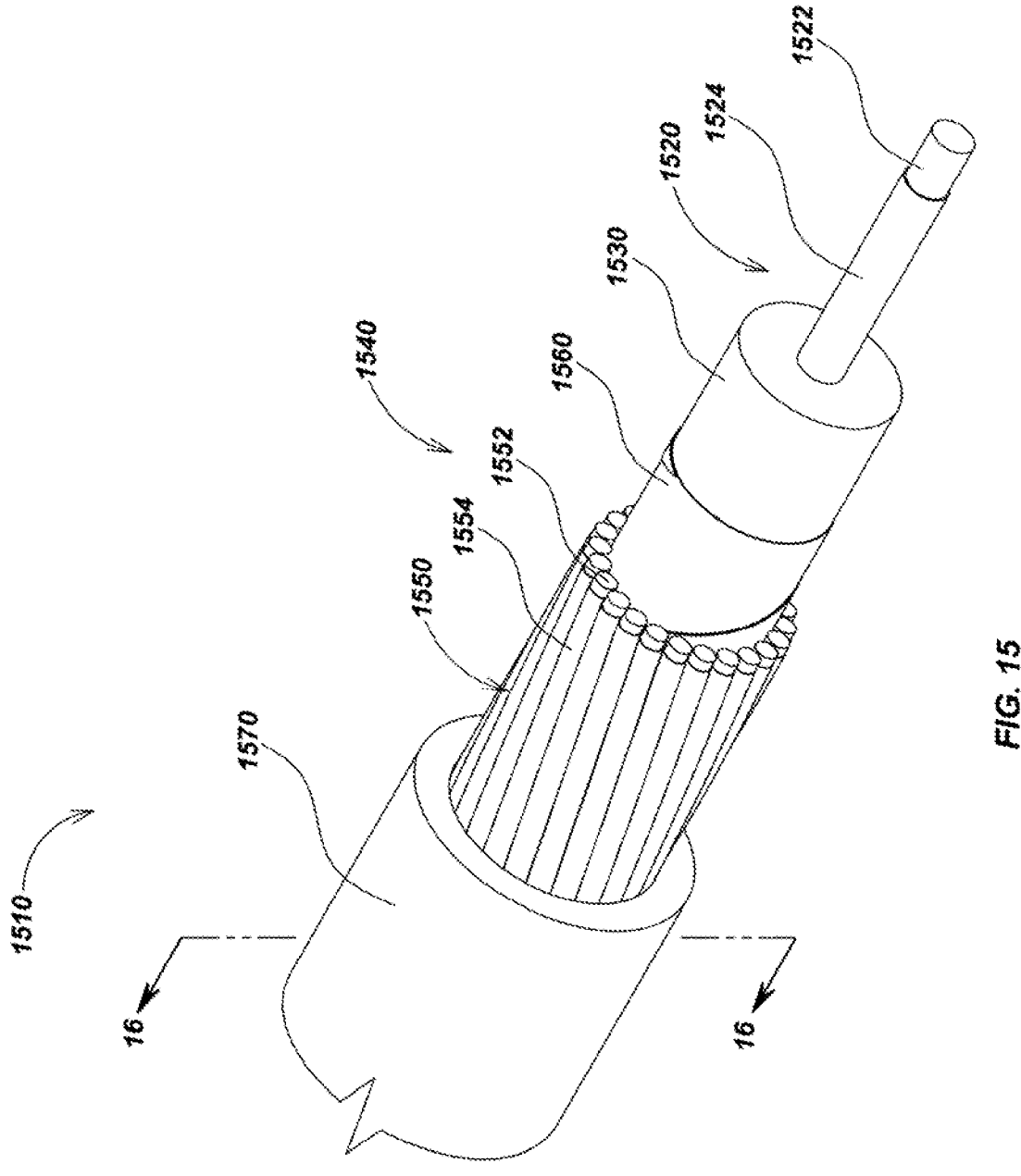
FIG. 15 is a detailed fragmentary isometric view of another embodiment of a coaxial video push-cable in accordance with certain aspects.
Figure 16:
FIG. 16 is a cross-section view of the coaxial video push-cable embodiment of FIG. 15, taken along line 16-16.
Figure 16:
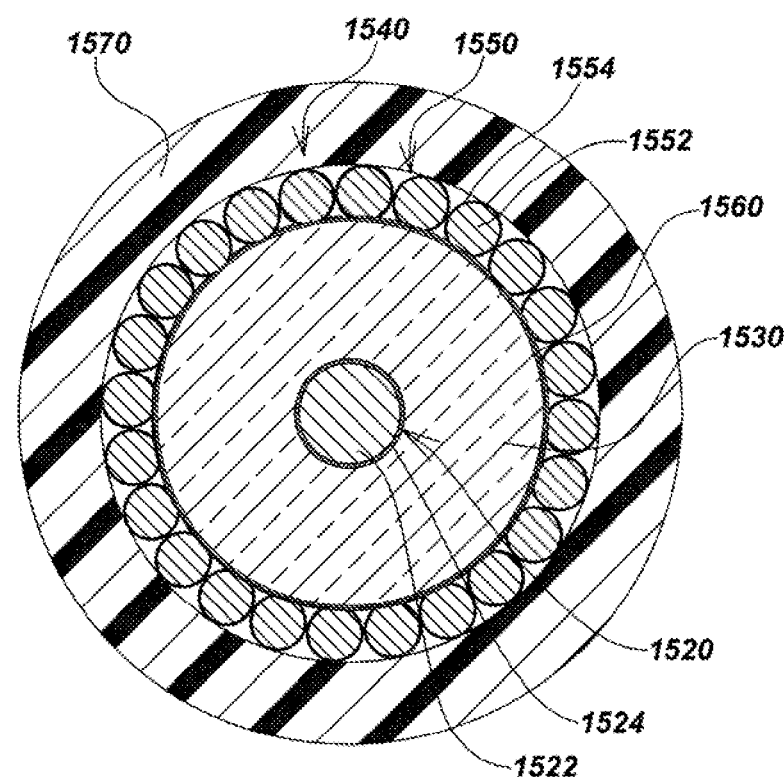

In further embodiments, a conductive tape layer may be positioned beneath the outer conductor array. As shown in FIGS. 15 and 16, the video push-cable 1510 may be such an embodiment where a conductive tape layer 1560 may be positioned beneath the outer conductor array 1540 and enclose the insulating dielectric layer 1530. The video push-cable 1510 may include a coaxial conductor structure with an inner or central conductor 1520, comprising elements 1522 and 1524 (and optional insulator layer), a dielectric element or layer 1530, and an outer conductor array (corresponding to an outer or shield conductor layer in a traditional coaxial cable) comprising elements 1552 and 1554. The outer conductor array 1540 may be a single layer array as shown in FIGS. 15 and 16, or a multi-layer array as shown in the embodiment of FIG. 4.

Within the coaxial video push-cable 1510, the inner conductor 1520 may comprise two or more conductive components, with a structural core or strengthening layer 1522 and a cladding or outer layer 1524.

During operation, power and/or signals may flow "outbound" in the inner conductor 1520 (and at higher frequencies, primarily in the outer layers 1550 and/or 1560) and return through the outer conductor array or other outer conductor element (it is noted that the sense of "outbound" and "return" current is provided solely for explanation-it is apparent that AC current will flow in both directions within the inner conductor and outer conductor array).

In applications where power is provided via the push-cable at higher AC frequencies, most of the current flow will be towards the outer surface of the inner conductor due to the well-known skin effect. Therefore, the inner conductor may be made as shown with a structural core of a strengthening material such as steel (which may have a relatively low electrical conductivity), and an outer layer bonded layer or cladding of a high electrical conductivity material, such as a copper, for carrying current with a minimum of resistive loss. It is noted that although the inner conductor is typically positioned at or near the center of the push-cable as shown in FIG. 16, it need not be exactly in the center in some embodiments, but rather, is positioned somewhere within the outer conductor array so as to form an approximately coaxial structure.

In some embodiments, multiple conductive elements in the inner conductor, rather than the single inner conductor 1520 as shown in FIGS. 15 and 16, may be used (e.g., as in Litz wire or other multi-conductor wire types for carrying higher frequency signaling and power). For example, in some embodiments the inner conductor 1520 may include multiple copper clad steel wires (or other conductor types as described herein) within the dielectric layer 1530 to form a central or inner conductor array (not shown).

In an exemplary embodiment, the inner conductor 1520 may comprise an insulated copper-clad steel wire 1522 (having lower conductivity relative to the cladding layer) within a higher conductivity cladding layer 1524 (e.g., of copper, etc.), both of which may be within an optional insulating layer (not illustrated). The insulating layer of the inner conductor 1520 may comprise polyimide quad-film or other comparable insulating material(s).

Insulating dielectric layer or element 1530 may surround the inner conductor 1520 as shown. The dielectric layer 1530 surrounding the inner conductor 1520 may be a single element, and in an exemplary embodiment may be a fiberglass or other high-strength material. The dielectric element may be in the form of a hollow tubular shape to provide stiffness and strength for forcing the coaxial video push-cable 1510 within a pipe or other void, such as within pipe 130 as illustrated in FIG. 1. In some embodiments, Kevlar® and/or other similar synthetic fibers may be used in addition to or in lieu of fiberglass in the dielectric layer. The dielectric layer 1530 may further be enclosed by a conductive tape layer 1560. The conductive tape layer 1560 may be wrapped about the outer dielectric layer 1530. The conductive tape layer 1560 may comprise of highly electrically conductive materials (e.g. copper, copper alloy, silver, silver alloy or the like).

An outer conductor array 1540, which may be comprised of helically wound (or otherwise oriented) individual outer conductors 1550, may surround the dielectric layer 1530 and conductive tape layer 1560 to provide the return current path in the coaxial video cable. The outer conductors 1550 may be structured similarly to the inner conductors 1520, but with a smaller diameter or cross-sectional area. For example, each outer conductor 1550 of the outer conductor array may comprise an outer conductor structural core 1552 and an outer conductor outer or cladding layer 1554. The outer conductors 1550 may be wrapped onto the dielectric layer 1530 and conductive tape layer 1560. The outer conductors 1550 may be helically wound about the dielectric layer 1530 and conductive tape layer 1560 as shown in FIGS. 15 and 16 or, in some embodiments, may be wound longitudinally (not shown). The conductive tape layer 1560 may contact the individual outer conductors 1550 providing a more continuous current pathway where gapping between individual outer conductors 1550 may exist.

An outer jacket or layer 1570 may encase the outer conductor array, dielectric layer, and inner conductor so as to protect and electrically insulate the internal push-cable elements from the external environment, which is often wet, dirty, cold, contaminated, etc. in typical inspection operations.

The structural cores 1522 and 1552 may comprise a very high strength steel, such as an HSLA alloy, plano wire, etc., thereby adding to the overall strength and durability of the coaxial video push-cable 1510. Other high strength materials may be combined with steel or other metals in the core, such as fibers, composites, nanostructured materials, and the like. Optional insulating layers may be used to mitigate shorting should the dielectric layer 1530 fail and break in use, thereby contributing to the overall durability of the video push-cable 1510.

In alternate embodiments, other types of wire or other conductors of varying composition, having varying amounts of strength and conductivity, may be used other than copper-clad steel as discussed herein, such as to provide a lower resistance coaxial cable at a higher cost (assuming higher cost conductive cladding is used), or to otherwise vary cable parameters (e.g., size, cost, electrical losses, operating frequency, etc.) for a particular application. In other embodiments, conductors such as 1520, 1550, and 1560 as shown in FIGS. 15 and 16 may comprise other conductive materials/metals. Furthermore, in some embodiments insulation on particular conductors may be omitted, for example to reduce cost or size and the like.

Figure 17:
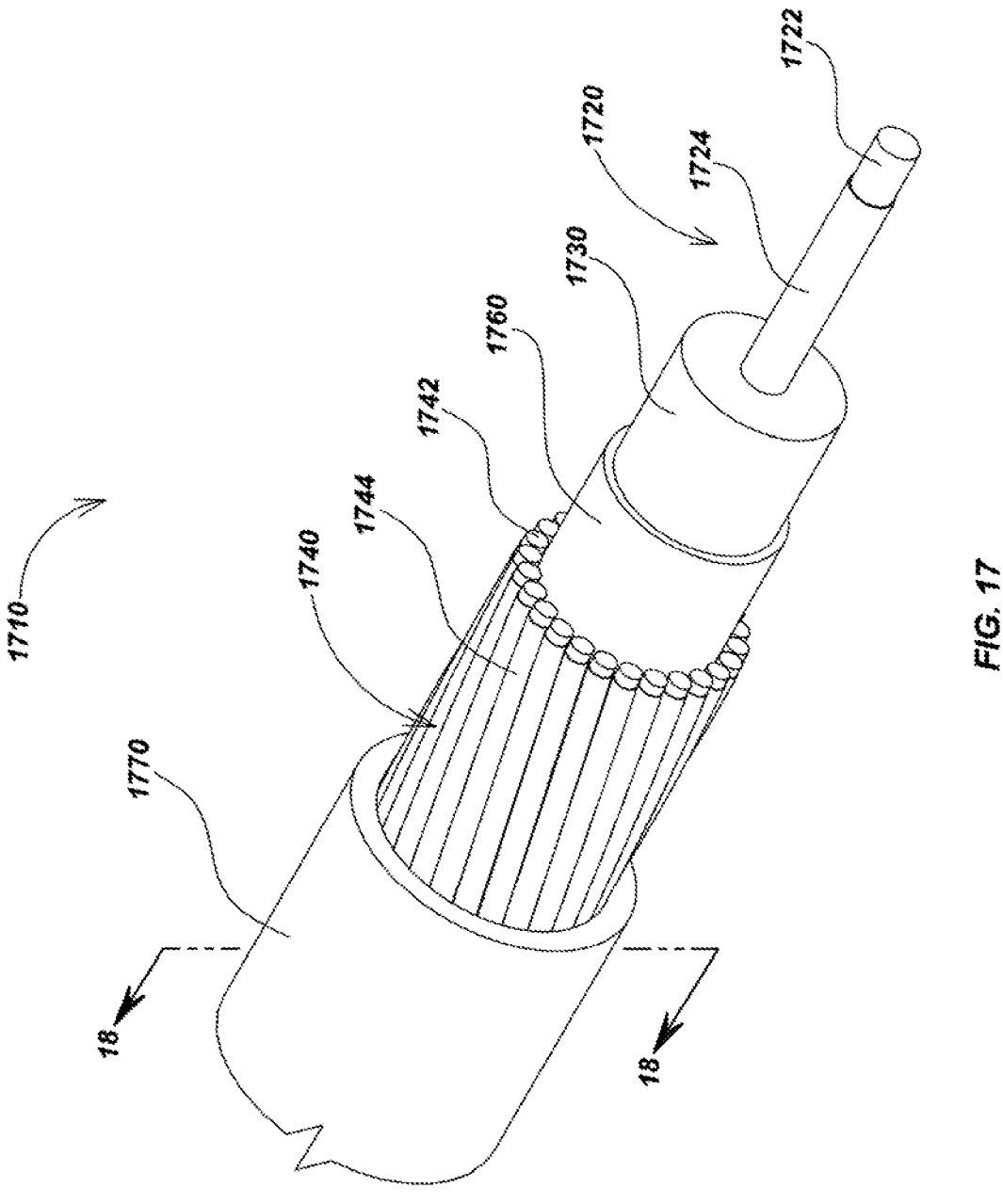
FIG. 17 is a detailed fragmentary isometric view of another embodiment of a coaxial video push-cable in accordance with certain aspects.
Figure 18:
FIG. 18 is a cross-section view of the coaxial video push-cable embodiment of FIG. 17, taken along line 18-18.
Figure 18:
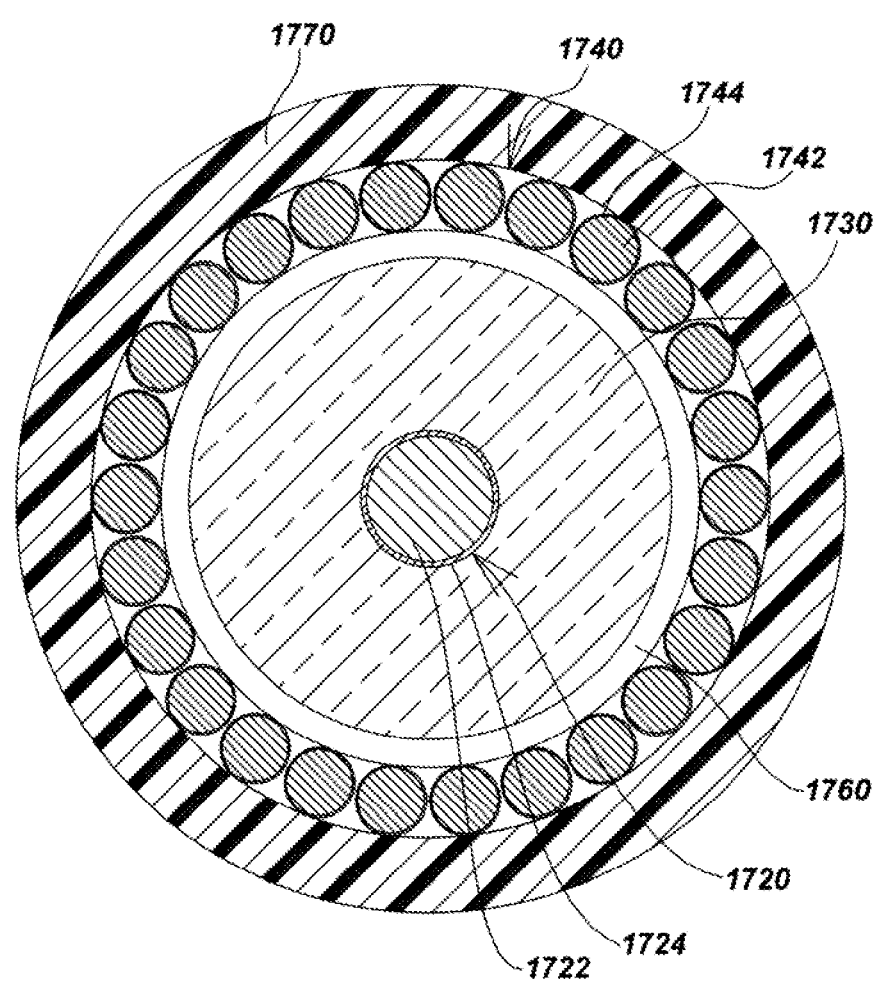

In additional embodiments, plating of the insulating dielectric layer of a coaxial video push-cable in accordance with aspects of the present disclosure with a conductive metal/material may be used as an additional conductive layer. For example, as shown in FIGS. 17 and 18, video push-cable embodiment 1710 includes a conductive plating layer 1760 applied to the insulating dielectric layer 1730.

Coaxial video push-cable embodiment 1710 may include a coaxial conductor structure with an inner or central conductor 1720, which may be a conductor of a single material or may be a tubular conductor such as those described previously herein. For example, inner conductor 1720 may comprise elements 1722 and 1724 (and optional insulator layer). Push-cable 1710 may also include an insulating dielectric element or layer 1730, and an outer conductor array 1740 (corresponding to an outer or shield conductor layer in a traditional coaxial cable) comprising elements 1752 and 1754. The outer conductor array 1540 may be a single layer array as shown in FIGS. 17 and 18, or a multi-layer array as shown in the embodiment of FIG. 4.

The inner conductor and/or outer conductor array may be the same as or those described previously herein in the various embodiments. For example, within the coaxial video push-cable 1710, the inner conductor 1720 may comprise two or more components, with a structural core or strengthening layer 1722 and a cladding or outer layer 1724.

During operation, power and/or signals may flow "outbound" in the inner conductor 1720 (and at higher frequencies, primarily in the outer layers 1740 and/or 1760) and return through the outer conductor array or other outer conductor element (it is noted that the sense of "outbound" and "return" current is provided solely for explanation-it is apparent that AC current will flow in both directions within the inner conductor and outer conductor array).

In applications where power is provided via the push-cable at higher AC frequencies, most of the current flow will be towards the outer surface of the inner conductor due to the well-known skin effect. Therefore, the inner conductor may be made as shown with a structural core of a strengthening material such as steel (which may have a relatively low electrical conductivity), and an outer layer bonded layer or cladding of a high electrical conductivity material, such as a copper, for carrying current with a minimum of resistive loss, with diameters of each layer selected based on particular operating frequencies, power levels, or other operational parameters. It is noted that although the inner conductor is typically positioned at or near the center of the push-cable as shown in FIG. 18, it need not be exactly in the center in some embodiments, but rather, is positioned somewhere within the outer conductor array so as to form an approximately coaxial structure.

In some embodiments, multiple conductive elements in the inner conductor, rather than the single inner conductor 1720 as shown in FIGS. 17 and 18, may be used (e.g., as in Litz wire or other multi-conductor wire types for carrying higher frequency signaling and power). For example, in some embodiments the inner conductor 1720 may include multiple copper clad steel wires (or other conductor types as described herein) within the dielectric layer 1730 to form a central or inner conductor array (not shown).

In an exemplary embodiment, the inner conductor 1720 may comprise an insulated copper-clad steel wire 1722 (having lower conductivity relative to the cladding layer) within a higher conductivity cladding layer 1724 (e.g., of copper, etc.), both of which may be within an optional insulating layer (not illustrated). The insulating layer of the inner conductor 1720 may comprise polyimide quad-film (Kapton) or other comparable insulating material(s).

An insulating dielectric layer or element 1730 may surround the inner conductor 1720 as shown. The dielectric layer 1730 surrounding the inner conductor 1720 may be a single element, and in an exemplary embodiment may be a fiberglass, synthetic fiber, or other high-strength material for providing longitudinal strength with some flexibility. The dielectric element may be in the form of a hollow tubular shape to provide stiffness and strength for forcing the coaxial video push-cable 1710 within a pipe or other void, such as within pipe 130 as illustrated in FIG. 1. In some embodiments, Kevlar® and/or other similar synthetic fibers may be used in addition to or in lieu of fiberglass in the dielectric layer. The dielectric layer 1730 may further be enclosed by conductive plating 1760. The conductive plating 1760 may be applied about the outer dielectric layer 1730 comprising of highly electrically conductive materials (e.g. copper, copper alloy, silver, silver alloy or the like).

An outer conductor array 1740, which may be comprised of helically wound (or otherwise oriented) individual outer conductors 1750, may surround the dielectric layer 1730 and conductive plating 1760 to provide the return current path in the coaxial video cable. The outer conductors 1750 may be structured similarly to the inner conductors 1720, but with a smaller diameter or cross-sectional area. For example, each outer conductor 1750 of the outer conductor array 1740 may comprise an outer conductor structural core 1752 and an outer conductor outer or cladding layer 1754. The outer conductors 1750 may be wrapped onto the dielectric layer 1730 and conductive plating 1760. The outer conductors 1750 may be helically wound about the dielectric layer 1730 and conductive plating 1760 applied thereto as shown in FIGS. 17 and 18 or, in some embodiments, may be wound longitudinally (not shown). The conductive plating 1760 may contact the individual outer conductors 1750 providing a more continuous current pathway where gapping between individual outer conductors 1750 may exist.

An outer jacket or layer 1770 may encase the outer conductor array, dielectric layer, and inner conductor so as to protect and electrically insulate the internal push-cable elements from the external environment, which is often wet, dirty, cold, contaminated, etc. in typical inspection operations.

The structural cores 1722 and 1752 may comprise a high strength steel, such as an HSLA alloy, plano wire, etc., thereby adding to the overall strength and durability of the coaxial video push-cable 1710. Other high strength materials may be combined with steel or other metals in the core, such as fibers, composites, nanostructured materials, and the like. Optional insulating layers may be used to mitigate shorting should the dielectric layer 1730 fail and break in use, thereby contributing to the overall durability of the video push-cable 1710.

In alternate embodiments, other types of wire or other conductors of varying composition, having varying amounts of strength and conductivity, may be used other than copper-clad steel as discussed herein, such as to provide a lower resistance coaxial cable at a higher cost (assuming higher cost conductive cladding is used), or to otherwise vary cable parameters (e.g., size, cost, electrical losses, operating frequency, etc.) for a particular application. In other embodiments, conductors such as 1720, 1750, and 1760 as shown in FIGS. 17 and 18 may comprise other conductive materials. Furthermore, in some embodiments insulation on particular conductors may be omitted, for example to reduce cost or size and the like.

In yet further embodiments (not illustrated), a push-cable may utilize one or more of the additional conductive layers disclosed with respect to FIGS. 9-18 (e.g. conductive braid or jacket 960 of FIGS. 9 and 10, conductive braid or jacket 1160 of FIGS. 11 and 12, conductive tape layer 1360 of FIGS. 13 and 14, conductive tape layer 1560 of FIGS. 15 and 16, and conductive plating 1760 of FIGS. 17 and 18) and/or other such conductive elements positioned to increase contact between the individual outer conductors of the outer conductor array and the additional conductive layer or layers. For instance, conductive paints, grease, and/or other conductive materials may be applied to the outer conductive array and/or be made to contact the outer conductor array so as to provide a more continuous current pathway where gapping between individual outer conductors may exist.

In other embodiments, the various conductors may comprise other metals or conductive materials besides the described copper-clad steel. In some embodiments, insulation may be omitted from one or more of the conductors.

Other combinations of the elements, components, features, and/or functions described previously herein may be combined in various additional embodiments. In addition, details regarding additional aspects, elements, components, features, functions, apparatus, and/or methods which may be used in additional embodiments in conjunction with disclosures herein are described in the co-assigned incorporated applications.

Those of skill in the art would understand that information and signals, such as analog or digital video signals, data signals, audio signals, or other information signals may be represented and transmitted using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The scope of the presently claimed invention is not intended to be limited to the aspects shown and described previously herein, but should be accorded the full scope consistent with the specification and drawings as reflected in the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein but is to be accorded the widest scope consistent with the description herein and accompanying drawings as reflected in the appended claims, as well as their equivalents.

We claim:

1. A system for video inspection of piping or cavities, comprising:

a camera head including an imaging sensor and a video signal transmitter coupled to receive at an input a video signal provided from imaging sensor; and a coaxial push-cable having a proximal end and a distal end, the push-cable comprising:

an inner tubular conductor comprising a steel structural core and an outer layer of a high electrical conductivity material, the inner tubular conductor coupled to a power source for powering the camera head;

an insulating dielectric layer disposed around the inner conductor; and an outer conductor array having a plurality of tubular conductors disposed helically around the insulating layer, each tubular conductor of the outer conductor array including a structural core and an outer layer of a high electrical conductivity material, wherein one or more of the tubular conductors of the outer conductor array is coupled to the camera head to carry video signals from the camera head through the push cable to a camera control unit (CCU) or other operatively coupled electronic device.

2. The system of claim 1, further comprising a conductive tape layer positioned beneath the outer conductor array.

3. The system of claim 1, further comprising a lighting element, wherein the lighting element is coupled to receives electrical power from the inner tubular conductor of the coaxial push cable to power a lighting element.

4. The system of claim 3, further comprising a sonde, wherein the sonde is coupled to receives electrical power from the coaxial push cable from the inner tubular conductor to power the sonde so as to generate magnetic field signals for sensing by an associated utility locator.

5. The system of claim 1, wherein the inner tubular conductors are copper clad steel conductors.

6. The system of claim 1, wherein the inner tubular conductors comprise Litz wire.

7. The system of claim 1, wherein the steel material is a high strength steel.

8. The system of claim 7, wherein the steel material is plano wire.

9. The system of claim 1, wherein the steel structural core further comprises a composite material.

10. The system of claim 1, wherein the steel structural core further comprise a nanostructured material.

11. The system of claim 1, wherein the outer layer of a high electrical conductivity material is bonded to the steel structural core.

12. The system of claim 1, wherein the outer layer of a high electrical conductivity material is a cladding layer on the steel structural core.

13. The system of claim 1, further comprising one or more additional inner tubular conductors comprising a steel structural core.

14. A system for video inspection of piping or cavities, comprising:

a camera head including an imaging sensor and a video signal transmitter coupled to receive at an input a video signal provided from imaging sensor; and a coaxial push-cable having a proximal end and a distal end, the push-cable comprising:

an inner tubular conductor comprising a steel structural core and an outer layer of a high electrical conductivity material;

an insulating dielectric layer disposed around the inner conductor;

an outer conductor array having a plurality of tubular conductors disposed helically around the insulating layer, each tubular conductor of the outer conductor array including a structural core and an outer layer of a high electrical conductivity material; and a cutting tool electrically coupled to the outer conductor at the distal end of the coaxial push-cable, wherein the cutting tool receives AC power from the coaxial push-cable to operate;

wherein an output of the video signal transmitter is coupled at the distal end of the push-cable to send images or a video signal through the push cable to a camera control unit (CCU) or other operatively coupled electronic device.

15. The system of claim 14, wherein the cutting tool is a rotary cutting head.

16. The system of claim 14, wherein the AC power is provided at a high frequency greater than 100 HZ.

17. The system of claim 14, wherein the AC power is provided at a high frequency greater than 1 kHz.

18. The system of claim 14, wherein the AC power is provided at a high frequency greater than 100 kHz.

19. The system of claim 14, wherein the AC power is provided at a high frequency greater than 1 MHz.

20. A system for video inspection of piping or cavities, comprising:

a camera head including an imaging sensor and a video signal transmitter coupled to receive at an input a video signal provided from imaging sensor; and a coaxial push-cable having a proximal end and a distal end, the push-cable comprising:

an inner tubular conductor comprising a flexible polymer structural core and an outer layer of a high electrical conductivity material;

an insulating dielectric layer disposed around the inner conductor; and an outer conductor array having a plurality of tubular conductors disposed helically around the insulating layer, each tubular conductor of the outer conductor array including a structural core and an outer layer of a high electrical conductivity material;

wherein an output of the video signal transmitter is coupled to one of the plurality of tubular conductors of the outer conductor array at the distal end of the push-cable to send images or a video signal through the push cable to a camera control unit (CCU) or other operatively coupled electronic devices.

21. A system for video inspection of piping or cavities, comprising:

a camera head including an imaging sensor and a video signal transmitter coupled to receive at an input a video signal provided from imaging sensor; and a coaxial push-cable having a proximal end and a distal end, the push-cable comprising:

an inner tubular conductor comprising a non-conductive structural core and an outer layer of a high electrical conductivity material coupled to provide electrical power to power the camera head;

an insulating dielectric layer disposed around the inner conductor; and an outer conductor array having a plurality of tubular conductors disposed helically around the insulating layer, each tubular conductor of the outer conductor array including a structural core and an outer layer of a high electrical conductivity material;

wherein an output of the video signal transmitter is coupled to a tubular conductor of the outer conductor array at the distal end of the push-cable to send images or a video signal through the push cable to a CCU or other operatively coupled electronic device.

\* \* \* \* \*